United States Patent
Wu et al.

(10) Patent No.: US 8,249,046 B2
(45) Date of Patent: Aug. 21, 2012

(54) INTERFERENCE MANAGEMENT WITH MIMO IN A PEER-TO-PEER NETWORK

(75) Inventors: Xinzhou Wu, Monmouth Junction, NJ (US); Thomas Richardson, South Orange, NJ (US); Junyi Li, Chester, NJ (US); Saurabh Tavildar, Jersey City, NJ (US); Pramod Viswanath, Champaign, IL (US)

(73) Assignee: QUALCOMM Incorporated, San Diego, CA (US)

( * ) Notice: Subject to any disclaimer, the term of this patent is extended or adjusted under 35 U.S.C. 154(b) by 656 days.

(21) Appl. No.: 12/477,356

(22) Filed: Jun. 3, 2009

(65) Prior Publication Data

US 2010/0309854 A1    Dec. 9, 2010

(51) Int. Cl.
*H04W 4/00* (2009.01)
*H04J 1/00* (2006.01)

(52) U.S. Cl. ............... 370/343; 455/63.1; 455/67.11

(58) Field of Classification Search .............. None
See application file for complete search history.

(56) References Cited

U.S. PATENT DOCUMENTS

| 2009/0015478 | A1 | 1/2009 | Li et al. | |
| 2010/0104036 | A1* | 4/2010 | Liao et al. | 375/260 |
| 2011/0019631 | A1* | 1/2011 | Kotecha et al. | 370/329 |

FOREIGN PATENT DOCUMENTS

WO    WO2009009538 A2    1/2009

OTHER PUBLICATIONS

International Search Report and Written Opinion—PCT/US2010/037341, International Search Authority—European Patent Office—Oct. 22, 2010 (082881).

* cited by examiner

*Primary Examiner* — Min Jung
(74) *Attorney, Agent, or Firm* — James O'Hare; Paul S. Holdaway

(57) ABSTRACT

Aspects relate to interference management in a multiple-input-multiple-output peer-to-peer network utilizing connection scheduling. When channel side information is available at both transmitter and receiver, both devices determine transmit/receiver beamforming vectors. Transmitter sends a first transmission request signal with first transmit beamforming vector and a second transmission request signal with second transmit beamforming vector in a transmission request block. Receiver estimates SINRs of the MIMO channels associated with the receive beamforming vectors and determines whether to return request response signals. Based on received request response signals, transmitter decides to transmit streams of data using the corresponding transmit beamforming vectors in the data burst. When channel side information is available only at receiver, transmitter sends one transmission request signal. Receiver estimates the SINRs of the MIMO channels associated with receive beamforming vectors using MMSE and/or successive interference cancellation (SIC), and returns request response signals in the request response block.

45 Claims, 15 Drawing Sheets

INTERFERENCE MANAGEMENT WITH MIMO IN A PEER-TO-PEER NETWORK

BACKGROUND

I. Field

The following description relates generally to interference management in communication systems and more particularly to mitigating the amount of interference in a multiple-input-multiple-output peer-to-peer communication environment.

II. Background

Wireless communication systems are deployed to provide various types of communication, such as voice, data, video, and others. A typical wireless communication system, or network, can provide multiple users access to one or more shared resources. For example, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless communication networks are established through a mobile device communicating with a base station or access point. The access point covers a geographic range or cell and, as the mobile device is operated, the mobile device can be moved in and out of these geographic cells. A network can also be constructed utilizing solely peer-to-peer devices without utilizing access points or the network can include both access points (infrastructure mode) and peer-to-peer devices. These types of networks are sometimes referred to as ad hoc networks. Ad hoc networks can be self-configuring whereby when a mobile device (or access point) receives communication from another mobile device, the other mobile device is added to the network. As mobile devices leave the area, they are dynamically removed from the network. Thus, the topography of the network can be constantly changing.

Performance for a wireless communication system can be enhanced by using beamformed transmissions to communicate between devices. Multiple transmit antennas can be used to form beamformed transmissions. Beamformed transmissions, also referred to as beams, typically cover a narrower area than transmissions using a single transmit antenna. A beam can be considered a virtual sector allowing a virtual six-sector system to be generated from a conventional three-sector system, for example. However, the signal to interference and noise ratio (SINR) is enhanced within the area covered by the beams. The communication system can utilize a fixed or predetermined set of beams. Although the fixed beam pattern can be updated or adapted, in contrast to a beam steering system, the beams in a fixed beam system are not dynamically updated based on individual user devices.

In peer-to-peer networks, there is no central scheduler to schedule the communications links to control an amount of interference. Thus, there is a need to manage interference in multiple-input-multiple-output peer-to-peer communication environments.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with mitigating interference in a multiple-input-multiple-output (MIMO) network utilizing connection scheduling management. Transmitting devices and receiving devices can individually make a determination whether to yield no transmissions, all transmissions, or any amount of transmissions there between, as a function of priority and interference level of each transmission.

An aspect relates to a method of operating a first communication device for receiving data traffic from a second communication device in a peer-to-peer communication network. The first communication device is equipped with at least two antennas. The method includes receiving a first signal and a second signal at the at least two antennas in a transmission request time interval. Method also includes applying a first beamforming vector to the first signal received at the at least two antennas to recover a first transmission request signal from the second communication device and applying a second beamforming vector to the second signal received at the at least two antennas to recover a second transmission request signal from the second communication device. Further, method includes determining whether to send at least one request response signal to the second communication device in a subsequent request response time interval and transmitting the at least one request response signal to the second device if it is determined to send the request response signals.

Another aspect relates to a wireless communications apparatus that includes a memory and a processor. Memory retains instructions related to receiving a first signal and a second signal at two or more antennas connected to wireless communications apparatus. Memory also retains instructions related to applying a first beamforming vector to the first signal received to recover a first transmission request signal and applying a second beamforming vector to the second signal to recover a second transmission request signal. Further, memory retains instructions related to evaluating whether to send a request response signal in a subsequent request response time interval and transmitting the request response signal if the evaluation indicates to send the request response signal. Processor is coupled to the memory and is configured to execute the instructions retained in the memory.

A further aspect relates to a wireless communications apparatus that receives data traffic in a peer-to-peer communications network. Wireless communications apparatus is equipped with at least two antennas. Included in wireless communications apparatus is means for receiving a first signal and a second signal at the at least two antennas in a transmission request time interval. Also included in wireless communications apparatus is means for applying a first beamforming vector to the first signal received at the at least two antennas to recover a first transmission request signal from the second communication device. Also included is means for applying a second beamforming vector to the second signal received at the at least two antennas to recover a second transmission request signal from the second communication device. Further, wireless communications apparatus includes means for determining whether to send at least one request response signal to the second communication device in a subsequent request response time interval and means for transmitting the at least one request response signal to a second communication device if it is determined to send the request response signals.

A further aspect relates to a computer program product comprising a computer-readable medium. Computer-readable medium includes a first set of codes for causing a computer to receive a first signal and a second signal at two antennas in a transmission request time interval. Also included is a second set of codes for causing the computer to apply a first beamforming vector to the first signal received at the two antennas to recover a first transmission request signal. Also included is a third set of codes for causing the computer to apply a second beamforming vector to the second signal received at the at least two antennas to recover a second transmission request signal. Further, computer-readable medium includes a fourth set of codes for causing the computer to determine whether to send at least one request response signal and a fifth set of codes for causing the computer to transmit the at least one request response signal.

Another aspect relates to at least one processor configured to receive data traffic in a peer-to-peer communication network. Processor includes a first module for receiving a first signal and a second signal at two or more antennas and a second module for applying a first beamforming vector to the first signal received to recover a first transmission request signal. Also included is a third module for applying a second beamforming vector to the second signal to recover a second transmission request signal. Further, processor includes a fourth module for evaluating whether to send a request response signal in a subsequent request response time interval and a fifth module for transmitting the request response signal if the evaluation indicates to send the request response signal.

Yet another aspect relates to a method of operating a first communication device for transmitting data traffic to a second communication device in a multiple-input-multiple-output peer-to-peer communication environment. The first device is equipped with at least two antennas. Method comprises transmitting a first transmission request signal with a first beamforming vector and a second transmission request signal with a second beamforming vector. The first and second transmission request signals are transmitted by the at least two antennas. Method also includes receiving signals at the at least two antennas in a subsequent request response time interval and recovering from the received signals at least one request response signal from the second communication device. The at least one request response signal corresponds to the first transmission request signal and the second transmission request signal. Further, method includes determining whether to send a data traffic signal to the second communication device as a function of the recovered request response signal and transmitting the data traffic signal to the second communication device if it is determined to send the data traffic signal.

Another aspect relates to a wireless communications apparatus that includes a memory and a processor. Memory retains instructions related to sending a first transmission request signal with a first beamforming vector and a second transmission request signal with a second beamforming vector. The first and second transmission request signals are sent by at least two antennas. Memory also retains instructions related to receiving signals at the at least two antennas in a subsequent request response time interval and recovering from the received signals at least one request response signal. The at least one request response signal corresponds to the first transmission request signal and the second transmission request signal. Additionally, memory retains instructions related to determining whether to send a data traffic signal as a function of the recovered request response signal and transmitting the data traffic signal if it is determined to send the data traffic signal. Processor is coupled to the memory and is configured to execute the instructions retained in the memory.

Yet another aspect relates to a wireless communications apparatus that transmits data traffic in a multiple-input-multiple-output peer-to-peer communication environment. Wireless communications apparatus includes means for transmitting a first transmission request signal with a first beamforming vector and a second transmission request signal with a second beamforming vector. The first and second transmission request signals are transmitted by at least two antennas. Wireless communications apparatus also includes means for receiving signals at the at least two antennas in a subsequent request response time interval and means for recovering from the received signals at least one request response signal from a communication device. The at least one request response signal corresponds to the first transmission request signal and the second transmission request signal. Wireless communications apparatus also includes means for determining whether to send a data traffic signal to the communication device as a function of the recovered request response signal and means for transmitting the data traffic signal to the communication device if it is determined to send the data traffic signal.

Still another aspect relates to a computer program product comprising a computer-readable medium. Included in computer-readable medium is a first set of codes for causing a computer to transmit a first transmission request signal with a first beamforming vector and a second transmission request signal with a second beamforming vector. The first and second transmission request signals are transmitted by at least two antennas. Computer-readable medium also includes a second set of codes for causing the computer to receive signals at the at least two antennas in a subsequent request response time interval and a third set of codes for causing the computer to recover from the received signals at least one request response signal. The at least one request response signal corresponds to the first transmission request signal and the second transmission request signal. Further, computer-readable medium includes a fourth set of codes for causing the computer to determine whether to send a data traffic signal as a function of the recovered request response signal and a fourth set of codes for causing the computer to transmit the data traffic signal if it is determined to send the data traffic signal.

A further aspect relates to at least one processor configured to transmit data traffic to a second communication device in a multiple-input-multiple-output peer-to-peer communication environment. Processor includes a first module for transmitting a first transmission request signal with a first beamforming vector and a second transmission request signal with a second beamforming vector. The first and second transmission request signals are transmitted by at least two antennas. Processor also includes a second module for receiving signals at the at least two antennas in a subsequent request response time interval and a third module for recovering from the received signals at least one request response signal. The at least one request response signal corresponds to the first transmission request signal and the second transmission request signal. Further, processor includes a fourth module for determining whether to send a data traffic signal as a function of the recovered request response signal and a fifth module for transmitting the data traffic signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects

DETAILED DESCRIPTION

Figure 1:
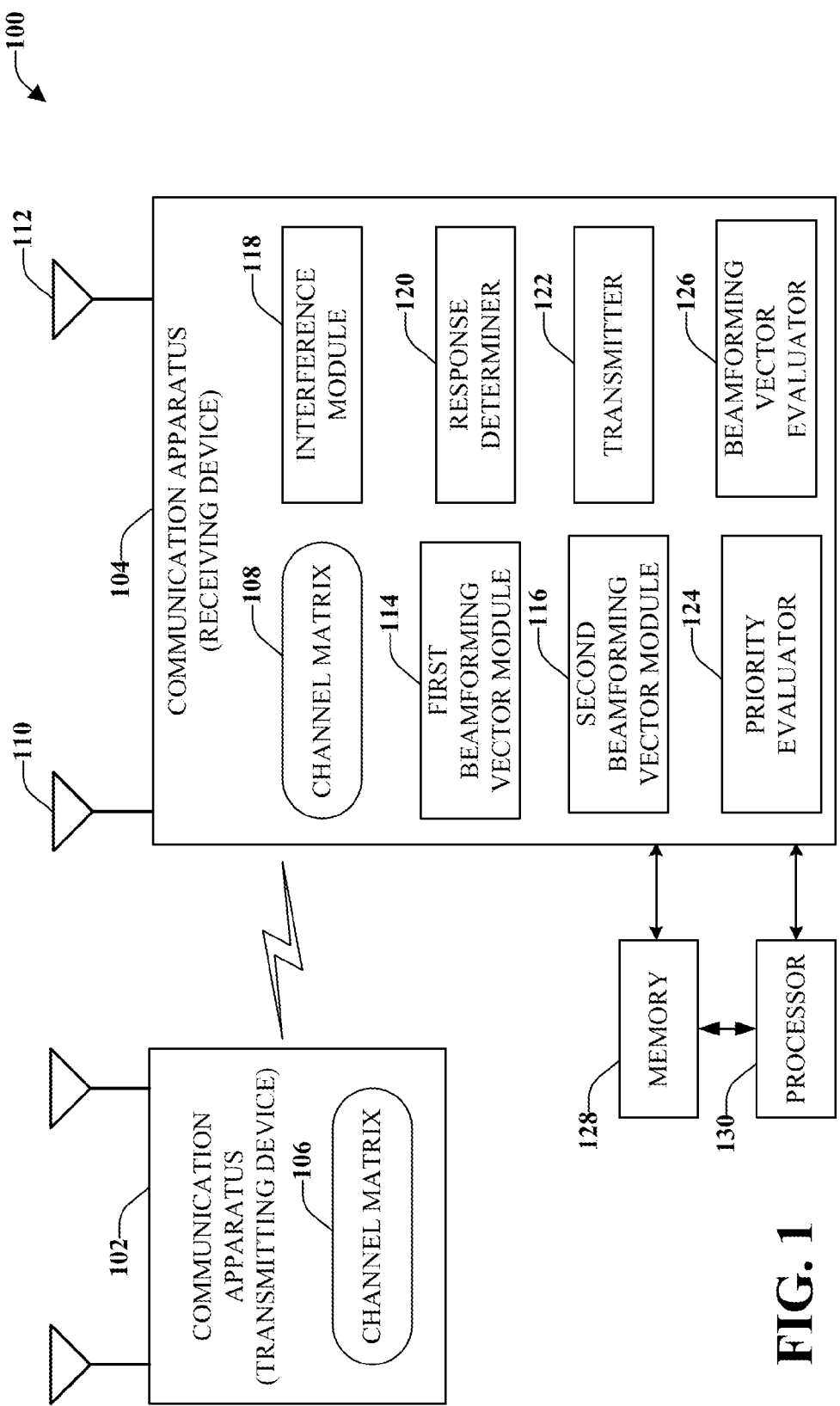
FIG. 1 illustrates a system for mitigating interference through utilization of connection scheduling management, according to an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and can contain some or all of the functionality of, an access point, node, Node B, e-NodeB, e-NB, or some other network entity.

Various aspects or features will be presented in terms of systems that can include a number of devices, components, modules, and the like. It is to be understood and appreciated that the various systems can include additional devices, components, modules, etc. and/or cannot include all of the devices, components, modules etc. discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

Referring now to FIG. 1, illustrated is a system 100 for mitigating interference through utilization of connection scheduling management, according to an aspect. System 100 is configured to provide an interference mitigation mechanism when at least a subset of devices within system 100 are equipped with multiple transmit/receive antennas and spatial multiplexing Multiple-Input-Multiple-Output (MIMO) antenna technology for communications between devices. Further, system 100 can be a peer-to-peer network in which devices communicate directly without utilization of a centralized scheduler (e.g., access point).

System 100 includes at least two communication apparatuses 102, 104 that are configured to convey information. System 100 is illustrated as including one transmitter device 102 and one receiver device 104. However, it should be understood that multiple transmitter devices 102 and multiple receiver devices 104 can be utilized in system 100, sometimes referred to as communication network or network. Further, although various aspects will be discussed with reference to a transmitter 102 and a receiver 104 performing separate functions, it should be understood that a transmitter 102 can also perform functions of receiving, as disclosed herein, and a receiver 104 can also perform functions of transmitting, as disclosed herein. Alternatively or additionally, receiver 104 can be a communication initiation device and transmitter 102 can be the device receiving the request for initiation of communication. That is to say, at times the roles of transmitter 102 and receiver 104 can be reversed.

In a MIMO scheme, both transmitting device 102 and receiving device 104 are equipped with multiple antennas. For the purposes of description, consider that each of transmitting device 102 and receiving device 104 is equipped with two antennas. Transmitting device 102 intends to transmit two sets of information bits to receiving device 104 in a given traffic segment. The two sets of information bits are encoded and modulated. Denote the corresponding sets of modulation symbols to be {A1, A2, ... } and {B1, B2, ... } respectively. In the MIMO scheme, transmitting device 102 uses a transmit matrix [S1, T1; S2, T2] so that the first antenna transmits symbols A1*S1+B1*T1, A2*S1+B2*T1, and so on, and the second antenna transmits symbols A1*S2+B1*T2, A2*S2+B2*T2 and so on. In the traffic segment, receiving device 104 receives two sets of symbols in its antennas, which are denoted to be {C1, C2, ... } in the first antenna and {D1, D2, ... } in the second antenna. To recover the two sets of information bits transmitted from transmitting device 102, in the MIMO scheme, receiving device 104 uses a receive matrix [U1, V1; U2, V2]. Specifically, receiving device 104 calculates a first set of demodulation symbols as C1*U1+D1*V1, C2*U1+D2*V1, and so on, and a second set of demodulation symbols as C1*U2+D1*V2, C2*U2+D2*V2, and so on. Receiving device 104 uses the first set of demodulation symbols to recover the first set of information bits, and the second set of demodulation symbols to recover the second set of information bits. It should be noted that the choice of transmit and receive matrices may depend on the MIMO channel between the transmitting and receiving devices and be designed to diagonalize the combined channel matrix (combining the transmit matrix, MIMO channel matrix, and the receive matrix).

In the receiver beam forming scheme, only receiving device 104 is required to be equipped with multiple antennas. Transmitting device 102 may be equipped with multiple antennas as well, according to some aspects. For purposes of explanation, consider that receiving device 104 is equipped with two antennas. Transmitting device 102 intends to transmit one set of information bits to receiving device 104 in a given traffic segment. In the traffic segment, receiving device 104 receives two sets of symbols in its antennas, which are denoted to be {E1, E2, ... } in the first antenna and {F1, F2, ... } in the second antenna. To recover the set of information bits transmitted from transmitting device 102 in the receiver beam forming scheme, receiving device 104 uses a receive vector [W1, W2]. Specifically, receiving device 104 calculates a set of demodulation symbols as E1*W1+F1*W2, E2*W1+F2*W2, and so on. Note that the choice of receive vector may be designed to maximize the signal to interference plus noise ratio.

In an exemplary system, before the traffic segment is transmitted, transmitting device 102 first sends a transmission request signal to receiving device 104 to indicate the transmission intention. Since the wireless channel is a shared medium, other devices in the vicinity also receive the transmission request signal. Based on the received power of the transmission request signal, those devices can predict the potential interference in the traffic channel that may be received from transmitting device 102 if transmitting device 102 proceeds to transmit the intended traffic segment.

After receiving the transmission request, receiving device 104 may send a request response signal to indicate that receiving device 104 is ready to receive the intended traffic segment from transmitting device 102. According to some aspects, receiving device 104 may choose not to send the request response signal. For example, receiving device 104 may intend to receive a traffic segment from a different transmitting device. Receiving device 104 may detect other transmission request signals in the vicinity and predict that the potential interference caused by other traffic segment transmissions in the traffic channel would be significant. Suppose that the request response signal has been sent. Since the wireless channel is a shared medium, other devices in the vicinity also receive the request response signal. Based on the received power of the request response signal, each of those devices can predict the potential interference in the traffic channel that it may generate to receiving device if it proceeds to transmit a traffic segment and, therefore, determine whether to transmit a traffic segment.

In the above exemplary system, the protocol of transmission request and request response signals enables distributed scheduling and interference management among multiple transmitting and receiving devices in the vicinity. In an aspect, where OFDM is used as a base signaling scheme, a transmission request signal or request response signal is sent over a tone in an OFDM symbol. The specific position of the tone and the OFDM symbol may be reserved to be used exclusively by the communication pair of transmitting device 102 and receiving device 104.

For example, in the receiver beam forming scheme, transmitting device 102 and receiving device 104 may have one specific position of the tone and the OFDM symbol to send the transmission request and another corresponding specific position of the tone and the OFDM symbol to send the request response signal. Those specific positions are reserved exclusively to the communication pair of transmitting device 102 and receiving device 104.

In the MIMO scheme, as discussed above, transmitting device 102 may intend to send two data streams in a given traffic segment to receiving device 104. In an aspect, transmitting device 102 may send two separate transmission requests to receiving device 104, one transmission request for each data stream. Each of the transmission requests is sent over a tone in an OFDM symbol and the specific position of the tone and the OFDM symbol is reserved by the communications pair. Transmitting device 102 utilizes a first beamforming vector [S1, S2] to send the first transmission request and a second beamforming vector [T1, T2] to send the second transmission request. Thus, at the specific position of the tone and the OFDM symbol reserved for the first transmission request, a first symbol S1 is sent at the first antenna and a second symbol S2 is sent at the second antenna. In a similar manner, at the specific position of the tone and the OFDM symbol reserved for the second transmission request, a second symbol T1 is sent at the first antenna and a second symbol T2 is sent at the second antenna.

Receiving device 104 utilizes a first receive beamforming vector [U1, V1] to receive the first transmission request and a second receive beamforming vector [U2, V2] to receive the second transmission request. Thus, at the specific position of the tone and the OFDM symbol reserved for the first transmission request, a first symbol C1 is received at the first antenna and a second symbol D1 is received at the second antenna. Receiving device 104 combines C1 and D1 to obtain a combined symbol C1*U1+D1*V1 for the first received transmission request. In a similar manner, at the specific position of the tone and the OFDM symbol reserved for the second transmission request, a first symbol C2 is received at the first antenna and a second symbol D2 is received at the second antenna. Receiving device 104 combines C2 and D2 to obtain a combined symbol C2*U2+D2*V2 for the second received transmission request.

If receiving device 104 intends to receive both data streams, receiving device 104 may send two separate request responses to transmitting device 102, one for each data stream. Each of the request responses is sent over a tone in an OFDM symbol and the specific position of the tone and the OFDM symbol is reserved by the communications pair. Receiving device 104 utilizes the first receive beamforming vector [U1, V1] to send the first request response and the second receive beamforming vector [U2, V2] to send the second request response. Thus, at the specific position of the tone and the OFDM symbol reserved for the first request response, a first symbol U1 is sent at the first antenna and a second symbol V1 is sent at the second antenna. In a similar manner, at the specific position of the tone and the OFDM symbol reserved for the second request response, a first symbol U2 is sent at the first antenna and a second symbol V2 is sent at the second antenna.

Receiving device 104 may determine to receive only one of the data streams, in which case receiving device 104 may send one request response in one of the two reserved positions utilizing the corresponding receive beamforming vector.

In the above exemplary system, the reserved channel resource for sending transmission requests and request responses are system resources in the sense that it needs to be shared among all the communication pairs that intend to communicate in the vicinity. For example, the total channel resource for sending transmission requests and request responses may be fixed. As more and more communication pairs reserve channel resource for sending their transmission requests and request responses, the remaining resource for new communication pairs becomes less and less. In particular, as described above, a communication pair may reserve one piece of channel resource if the receiver beam forming scheme is used or two pieces of channel resource if the MIMO scheme is used. Thus, the communication pair occupies more channel resource if the MIMO scheme is used than if the receiver beam forming scheme is used.

For purposes of discussion, a channel matrix 106, 108 (or channel side information) between transmitter 102 and receiver 104 is available at both devices 102, 104. For example, knowledge of the channel matrix is possible in a Time Division Duplex (TDD) type of system when channel is static since channel estimation is not expensive in a TDD environment. The channel information can be obtained through various techniques and these techniques will not be discussed herein for purposes of simplicity. When channel side information is available at both transmitter 102 and receiver 104, a Singular Value Decomposition (SVD) technique can be utilized. After SVD, both transmitter 102 and receiver 104 are aware of the transmit/receive beamforming vectors that should be utilized for the transmission and the channel between devices 102, 104 simply becomes a vector channel with no correction in between.

Figure 2:
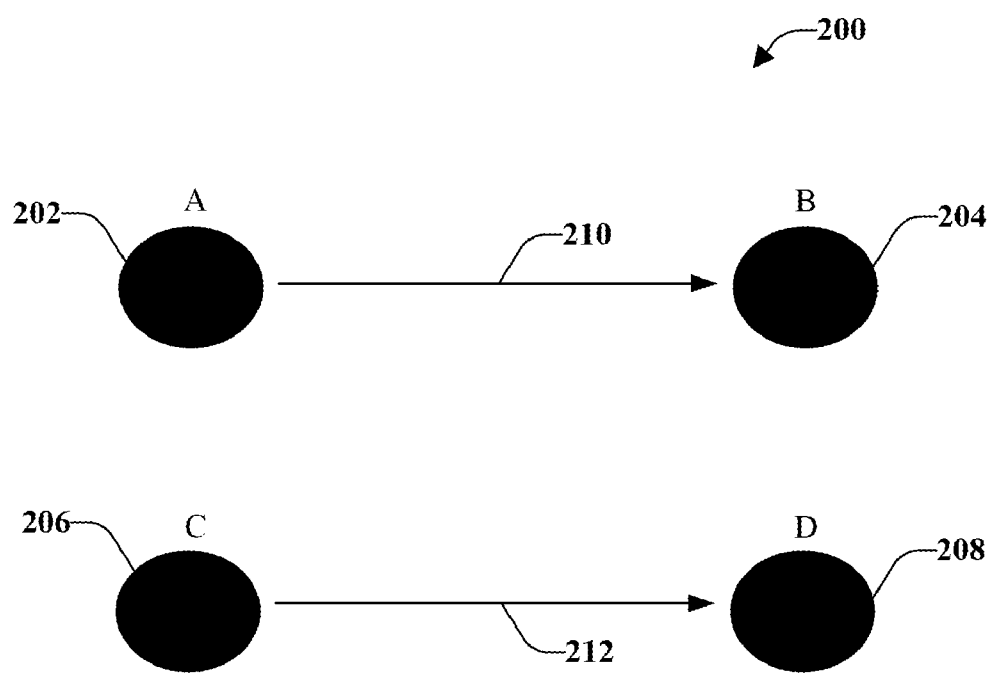
FIG. 2 illustrates a schematic representation of communication between network nodes utilizing a single antenna.

The disclosed aspects relate to a situation when multiple transmitting devices are to communicate with respective multiple receiving devices. In order to provide context for the disclosed aspects, FIG. 2 illustrates a schematic representation 200 of communication between network nodes utilizing a single antenna. Illustrated are four devices, Device A 202, Device B 204, Device C 206, and Device D 208. Devices A 202 and C 206 can be transmitters (e.g., transmitting device 102 of FIG. 1) and Devices B 204 and D 206 can be receivers (e.g., receiving devices 104 of FIG. 1). For purposes of this discussion, Device A 202 discovered and has data to communicate over a link 210 with Device B 204 and Device C 206 discovered and has data to communicate over a link 212 with Device D 208. A distribution scheduling decision can be made to determine whether only one of the links 210, 212 should transfer at a given time or whether both links 210, 212 can transmit at substantially the same time.

Figure 3:
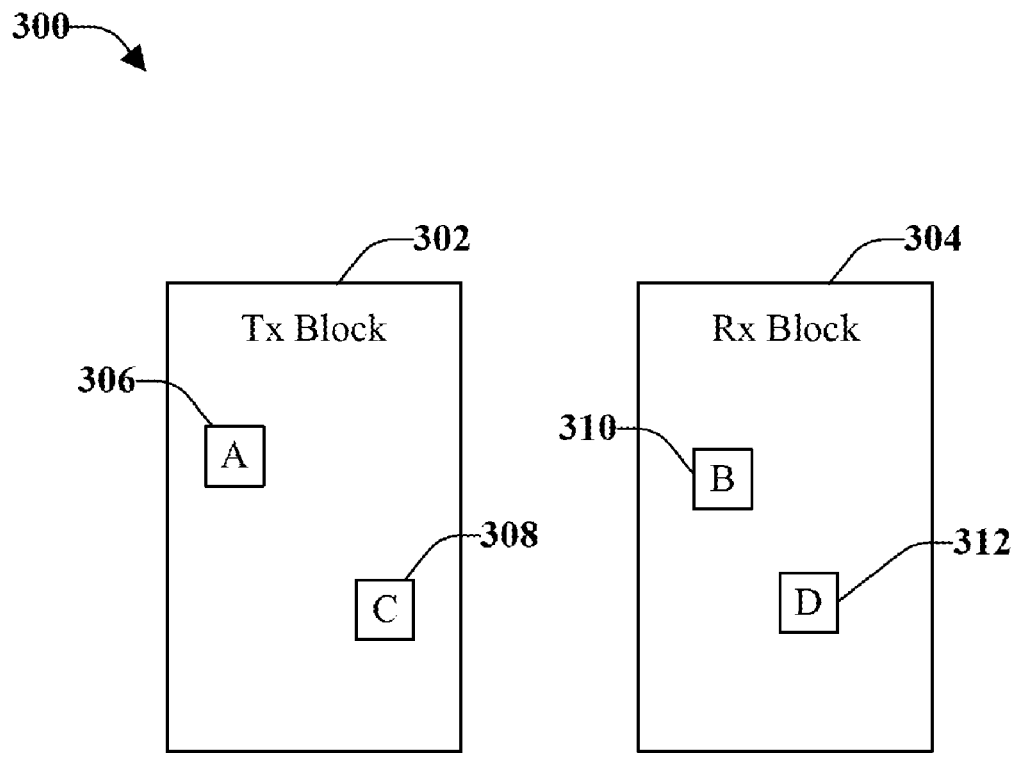
FIG. 3 illustrates connection scheduling for a single antenna.

Each link 210, 212 can have a distinct Connection Identifier (CID), which can be a number between "1" and "168", for example. A protocol can be utilized that assigns a different number to each connection or link 210, 212. The techniques utilized to assign the CID can be any technique for assigning the CID and will not be discussed further herein. For purposes of explanation, link 210 has a CID of "15" and link 212 has a CID of "27". Based on the CIDs, there are connection scheduling grids 300 for a single antenna, examples of which are illustrated in FIG. 3.

Illustrated at 302 is a Transmit (Tx) block, which is utilized to make a transmission request, and at 304 is a Receive (Rx) block, which is utilized to reply to the request by sending a request response. As a function of the CID and the particular time, one tone at one OFDM symbol is assigned in Tx block 302 and one tone at one OFDM symbol in Rx block 304. For example, node A 202 (of FIG. 2) is assigned tone 306 and Node C 206 is assigned tone 308 in Tx block 302. In Rx block 304, Node B 204 is assigned tone 310 and Node D 208 is assigned tone 312. If Node A 202 has a request to send to Node B 204, Node A 202 places energy in tone 306, which is the tone associated with CID "15" (link 210) at this time. In a similar manner, if Node C 206 has a request for Node D 208, Node C 206 places energy in tone 308, which is the tone associated with CID "27" (link 212) at this time.

Each receiving node (e.g., receiver 104 of FIG. 1) utilizes the notion of priority, which indicates that the physical order in which the tones are placed determines the priority. In this example, since tone 306 (Node A 202) is ahead of tone 308 (Node C 206), Node A 202 has a higher priority than Node C 206. Thus, connection A-B (link 210) has a higher priority than connection C-D (link 212).

Nodes B 204 and D 208 monitor the entire TX block 302 and each node 204, 208 determines whether to yield or whether it does not need to yield. Node B 204 evaluates Tx block 302 and identifies the requests 306 and 308 and determines that request 306 (from Node A 202) is a higher priority. Thus, Node B 204 determines that it does not have to yield. Node D 208, however, evaluates the requests 306 and 308 and determines that request 308 (from Node C 206) is a lower priority than request 306 (from Node A 202) and a determination whether to yield to Node A 202 should be performed by Node D 208. Node D 208 can make the determination based on a power measurement (e.g., Signal to Interference Plus Noise Ratio (SINR)). Thus, Node D 208 measures these two powers (in tones 206 and 208) to obtain an estimate that indicates if Node A 202 and Node C 206 were to transmit at substantially the same time, whether the signal from Node C 206 will be received at Node D 208 with sufficient SINR. If there is a potential that the signal will not be received (e.g., Node A 202 causes too much interference) with sufficient SINR, Node D 208 will yield.

Nodes A 202 and C 206 monitor Rx Block 304 to determine whether the corresponding Nodes returned an echo (e.g., request response), which confirms receipt of the transmission request. If a node yielded, it will not return an echo. For purposes of this example, Node D 312 did not perform Rx yielding (e.g., the determination is that excessive interference would not be encountered). Thus, in Rx block 304, the receivers (Nodes B 204 and D 208) would send request responses, confirming receipt of respective transmission requests 306, 308. Thus, Node B 204 will return an echo 310 and Node D 208 will return an echo 312.

Nodes A 202 and C 206 are monitoring Rx Block 304 and can perform a protocol referred to as transmit (Tx) yielding. Thus, Node A 202 will review Rx Block 304 and evaluate the echoes 310 and 312 and determine echo 310 has a higher priority (e.g., it is ahead of echo 312). Since echo 310 is for Node A 202, Node A 202 does not need to yield. However, Node C 206 will evaluate the echoes 310 and 312 and determine that the echo 312 from Node D 308 is a lower priority. Node C 206 will ascertain whether it needs to yield. Thus, Node C 206 determines that if it were to transmit, whether the traffic signal from Node C 206 would cause excessive interference to Node B 204 and, therefore, damage the higher priority communication from Node A 202 to Node B 204. If the determination is that there is not too much interference (e.g., the interference cost is low), Node C 206 will not yield. If there is too much interference (e.g., the interference cost is high), Node C 206 will yield.

Denote $P_a$, $P_b$, and $P_c$ to be the transmission powers of Node A 202, Node B 204, and Node C 206, respectively. Denote $h_{ab}$ and $h_{bc}$ to be the channel gain between Node A 202 and Node B 204 and between Node B 204 and Node C 206, respectively. Thus, the received power of the transmission request 306 at Node B 204 is equal to $P_a h_{ab}$. Using an inverse power $$P_b = \frac{C}{P_a h_{ab}},$$

where C is a constant. The received power of the request response 310 at Node C 206 is equal to $$\frac{C h_{bc}}{P_a h_{ab}}.$$

Node C 206 can multiply that quantity with the transmission power of Node C 206 to calculate an interference cost to Node B 204:

$$\frac{C h_{bc} P_c}{P_a h_{ab}}.$$

It can be shown that the interference cost is inversely proportional to the SINR at Node B 204 assuming Node C 206 is the only interferer. Therefore, Node C 206 may use the above interference cost to determine whether to yield.

Figure 4:
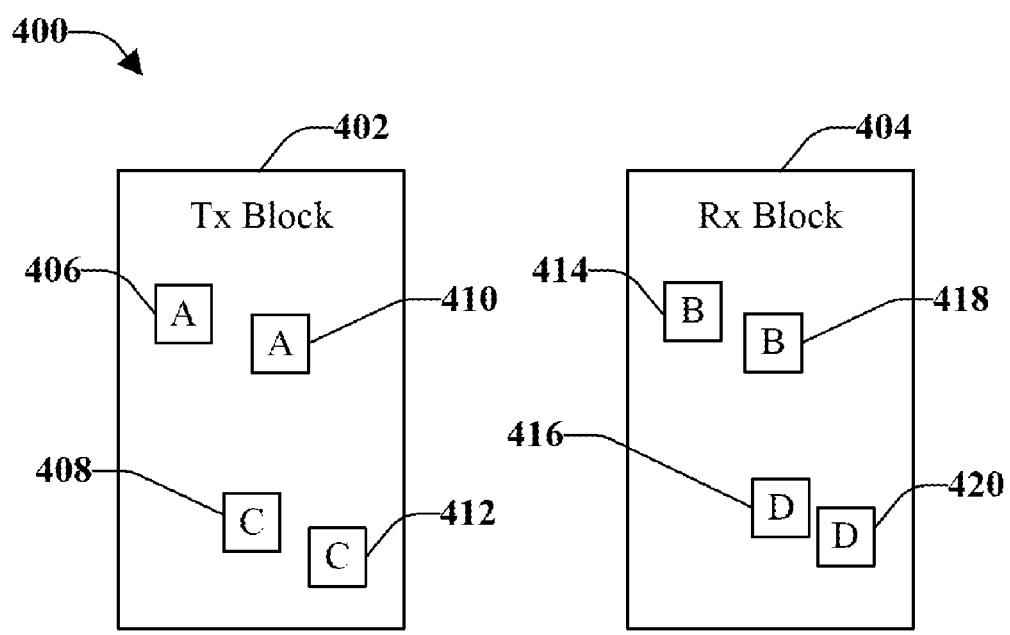
FIG. 4 illustrates connection scheduling grids for a MIMO system.

As stated, the above discussion relates to a single-input-single-output situation. The disclosed aspects relate to Multiple-Input-Multiple-Output (MIMO), or devices that have multiple transmit antennas and multiple receive antennas. Thus, the disclosed aspects will now be discussed with reference to FIG. 1 and FIG. 4, which illustrates connection scheduling grids 400 for a MIMO system. Illustrated at 402 is an example transmit block (Tx Block) and at 404 is an example receive block (Rx Block). For purposes of describing the various aspects, the features will be described with reference to two transmit antennas and two receive antennas (a 2-by-2 case). However, the disclosed aspects can be easily extended to more general scenarios. In a 2-by-2 case, transmitter 102 sends a first transmit request signal 406 or 408 (depending on which device is performing the transmitting, Node A 202 or Node C 206) with a first transmit beamforming vector and a second transmit request signal 410 or 412 with a second transmit beamforming vector in a transmit request block, illustrated at 402.

The first signal and the second signal are received at the two or more antennas 110, 112 of receiver 104 (Node B 204 or Node D 208). The signals can be received in a transmission request time interval. In accordance with some aspects, first signal and second signal are received in two distinct channel resources, wherein one channel resource corresponds to at least one tone in an OFDM symbol.

A first beamforming vector module 114 is configured to apply a first beamforming vector to the first received signal to recover a first transmission request signal from transmitter 102. A second beamforming vector module 116 is configured to apply a second beamforming vector to the second signal received at the antennas 110, 112 to recover a second transmission request signal from transmitter 102.

Also included in receiver 104 is an interference module 118 that is configured to estimate an interference amount. A first interference amount associated with the first transmission request signal and a second interference amount associated with the second transmission request signal can be estimated by interference module 118. In accordance with some aspects, the first interference amount is indicative of the power of an interference to be seen by receiver 104 when a data traffic is received from transmitter 102 that uses the first beamforming vector. Therefore, receiver 104 of Node D 208 uses the first beamforming vector to combine the interfering requests received at the two antennas in the Tx Block 402 to determine the interference power for the first transmission request. Given the priority among 406, 408, 410, and 412, illustrated in FIG. 4, the two interfering requests are 406 and 410. Receiver 410 of Node D 208 utilizes the first beamforming vector to combine the signal received at the two antennas in 408 to determine the signal power of the first transmission request.

The second interference amount is indicative of a power of an interference to be seen by receiver 104 when a data traffic is received from transmitter 102 that uses the second beamforming vector. Therefore, receiver 104 of Node D 408 utilizes the second beamforming vector to combine the interfering requests received at the two antennas in the Tx Block 402 to determine the interference power for the second transmission request. Given the priority among 406, 408, 410, and 412, illustrated in FIG. 4, the two interfering requests are 406 and 410. Receiver 104 of Node D 208 utilizes the second beamforming vector to combine the signal received at the two antennas in 412 to determine the signal power of the second transmission request. Note that in FIG. 4 the transmission requests 406 and 410 both are of a higher priority than transmission requests 408 and 412. Therefore, when receiver 104 of Node D 208 calculates the interference power for both the first and second transmission requests 408 and 412, receiver 104 includes the received power of both 406 and 410. Due to the fact that the first and second beamforming vectors are most likely different, the interference power determined for the first transmission request may be different from the interference power determined for the second transmission request.

In a different scenario (not illustrated), suppose that the priority order from high to low is transmission requests 406, 408, 410, and 412. In this case, when receiver 104 of Node D 208 calculates the interference power for the first transmission request 408, receiver 104 includes the received power of only 406 because 406 is of higher priority than 408, but 410 is of lower priority than 408. However, when receiver 104 of Node D 208 calculates the interference power for the second transmission request 412, receiver 104 includes the received power of both 406 and 410 because both 406 and 410 are of higher priority than 412.

A response determiner 120 is configured to decide whether to send one or more request response signals to transmitter 102 in a subsequent request response time interval. The decision by response determiner 120 can be made, in part, as a function of the estimated first interference amount, the second interference amount, or both the estimated first interference amount and the estimated second interference amount. According to some aspects, it is determined to send at least one request response signal if first interference amount is below a certain threshold and if second interference amount is below the certain threshold. For example, the ratio of the first interference amount and the first signal amount is below a certain threshold.

A transmitter 122 is configured to transmit the one or more request response signals (414, 416 or 418, 420). One or more of the request response signals can comprise a first request response signal that corresponds to the first transmission request signal and can be sent if the first interference amount is below a certain threshold. According to some aspects, the one request response signal can comprise a second request response signal that corresponds to the second transmission request signal. The second request response signal can be determined to be sent if the second interference amount is below a certain threshold. The second request response signal can be transmitted with a second beamforming vector. According to some aspects, the interfering transmission request signal is of a higher priority than the second transmission request signal from transmitter 102. The second interference amount can be estimated as a function of a power of the recovered interfering transmission request signal.

Response determiner 120 can independently determine whether to send the first request response signal corresponding to the first transmission request and whether to send the second request response signal corresponding to the second transmission request. Response determiner 120 may determine to transmit both request responses, only one request response, or no request responses. Even if the first transmission request may have higher priority than the second transmission request, response determiner 120 may decide to send the second request response and to not send the first request response, as the second interference amount may be less than the first interference amount since different beamforming vectors are being used to receive the first and second transmission request signals.

In accordance with some aspects, the first request response signal is transmitted with a first beamforming vector. For example, transmitter 102 can utilize two receive beamforming vectors in receiver block 404. It should be noted that the signals 406-420 can be located anywhere in the respective blocks 402, 404 and the locations shown are for illustration purposes only. The signals 406, 410 sent by Node A can be referred to as transmit eigenvectors $V_{AB}^+$ and the signals 408, 412 sent by Node C can be referred to as transmit eigenvectors $V_{CD}^+$. The signals 414, 418 sent by node B can be referred to as receive eigenvectors $U_{AB}^+$ and the signals 416, 420 sent by Node D can be referred to as receive eigenvectors $U_{CD}^+$. Since the channel matrix 106, 108 is known by both devices, a singular value composition can be constructed for the link between Nodes A and B as:

$$H_{AB} = U_{AB} \wedge V_{AB}$$     Equation 2.

For a MIMO system, the transmission yielding protocol can be performed at both transmitter 102 and receiver 104, which is similar to the single antenna situation described above. For the receiving yielding portion, receiver 104 receives each tone or vector (e.g., vectors 406 and 410). An independent decision on the two vectors 406, 410 that receiver 104 might receive in the data traffic can be conducted. For example, a priority evaluator 124 can be configured to recover an interfering transmission request signal in the transmission request time interval and determine a priority level. The interfering transmission request signal might be a higher priority than the first transmission request signal from transmitter 102 and the first interference amount can be estimated as a function of the power of the recovered interfering transmission request signal.

According to some aspects, the interfering transmission request signal is sent by a third device (e.g., Node C 206 of FIG. 2) to a fourth device (e.g., Node D 208 of FIG. 2). Interfering transmission request signal indicates that third device intends to send a data traffic signal to fourth device and this signal will interfere with the data traffic signal to be sent from transmitter 102 (e.g., Node A 202 of FIG. 2) to receiver 104 (e.g., Node B 204 of FIG. 4).

In accordance with some aspects, this determination can be performed by priority evaluator 124 that ascertains whether there is a higher priority transmission. For example, priority evaluator 124 can determine whether vector 406 is a higher priority than vector 408 and/or whether vector 410 is a higher priority than vector 412. This determination can be made by priority evaluator 124 as a function of the physical order in which the vectors are assigned in the block 402.

If priority evaluator 124 determines that the vectors for apparatus 102 are a higher priority, there is no yielding. However, if priority evaluator 124 determines that another communication link has a higher priority, the amount of interference that would be seen on the communication link is measured. The higher priority vector (e.g., vector 410) can be multiplied with the beamforming vector (e.g., vector 412) receiver 104 will utilize. Thus, the first and second eigenvectors are multiplied to calculate the interference impact after performing beamforming.

Based on the observation, response determiner 120 can perform Rx yielding to decide to reply with two transmit request responses, one transmit request response (yield one of the transmit requests), or none (yield both transmit requests from transmitter 102). Thus, the echo sent by Node B can be $U_{AB}$ first vector and $U_{AB}$ second vector. In a similar manner, the echo sent by Node D can be $U_{CD}$ first vector and $U_{CD}$ second vector. If yielding is not performed, transmitter 122 sends the signal in the direction of the vector.

In accordance with some aspects, a data traffic signal from transmitter can be received, at antennas 110, 112, subsequent to transmitting the one or more request response signals. The first beamforming vector can be applied to the received data traffic signal to recover a first set of data information.

In accordance with some aspects, a data traffic signal is received from transmitter 102 subsequent to transmitting the one or more request response signals. The first beamforming vector can be applied to the received data traffic signal to recover a first set of data information. The second beamforming vector can be applied to the received data traffic signal to recover a second set of data information.

According to some aspects, receiver 104 includes a beamforming vector evaluator 126 that is configured to calculate a first beamforming vector and a second beamforming vector for receiving data traffic from transmitter 102 before receiving the signals at the two antennas in the transmission request time interval.

At the transmitter 102 side (Node A 202 or Node C 206), based on signals received at transmission request response block, transmitter 102 can make a determination whether to transmit zero, all, or a subset of the streams of data utilizing pre-determined beamforming vectors in the data burst. Additional description is provided with reference to FIG. 5.

In some situations, the transmitter does not have the MIMO channel information, that is to say, the transmitter cannot determine the singular value decomposition (SVD) method to diagonalize the channel matrix. However, the receiver side information is available. In this case, two transmit antennas will transmit two different streams of data with a similar power (P/2) during a data burst without applying any beamforming vector. For example, each of the two transmit antennas transmit one of the two data streams. The receiver antennas will receive two non-orthogonal data streams and can apply minimum mean-squared error (MMSE) to separate and recover the two data streams. In accordance with some aspects, MMSE can be utilized with Successive-Interference-Cancellation (SIC) to orthogonalize the two data streams. In this case, due to the correlation between the two streams, a level of heuristics can be introduced.

On the transmitter 102 side, only one transmission request signal should be transmitted using power P (instead of power P/2). Power P is utilized because the effect of two antennas transmitting independent data streams with power P/2 is about the same as a single antenna transmitting power P to neighboring users (e.g., receiver 104). The receiver 104 will send back two transmit request response signals in the transmit request response block. Receiver 104 can transmit these response signals using the two beamforming vectors that would be utilized in the data transmission block, if receiver 104 decides not to yield for the current data transmission. Those two beamforming vectors are determined, for example, according to the MMSE principle to maximize the SINR when the two data streams are to be recovered.

In accordance with some aspects, due to the correlation between two streams, receiver 104 might decide to yield the current data transmission block whenever this is a higher-priority strong interferer for either of its two streams. The transmitter yielding mechanism occurs similar to the single antenna case.

System 100 can include memory 130 operatively coupled to receiver 104. Memory 130 can be external to receiver 104 or can reside within receiver 104. Memory 130 can store information related to receiving signals that are intended for receiver 104. Memory 130 can also store information related to applying beamforming vectors to the signals to recover respective transmission request signals and ascertaining if request response signals should be transmitted. Memory 130 can further store instructions related to determining an interference amount of the second transmission if the priority level of the at least a second transmission is higher than the priority level of the second steam of data. Further instructions can relate to yielding zero or more transmit request responses as a function of an independent review of the priority levels and the interference amounts. Further, memory 130 can store other suitable information related to signals transmitted and received in a communication network. A processor 132 can be operatively connected to receiver 104 (and/or memory 130) to facilitate analysis of information related to interference management in a communication network. Processor 132 can be a processor dedicated to analyzing and/or generating information received by receiver 104, a processor that controls one or more components of system 100, and/or a processor that both analyzes and generates information received by receiver 104 and controls one or more components of system 100.

Memory 130 can store protocols associated with managing interference, taking action to control communication between receiver 104 and transmitter 102, etc., such that system 100 can employ stored protocols and/or algorithms to achieve improved communications in a peer-to-peer wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 5:
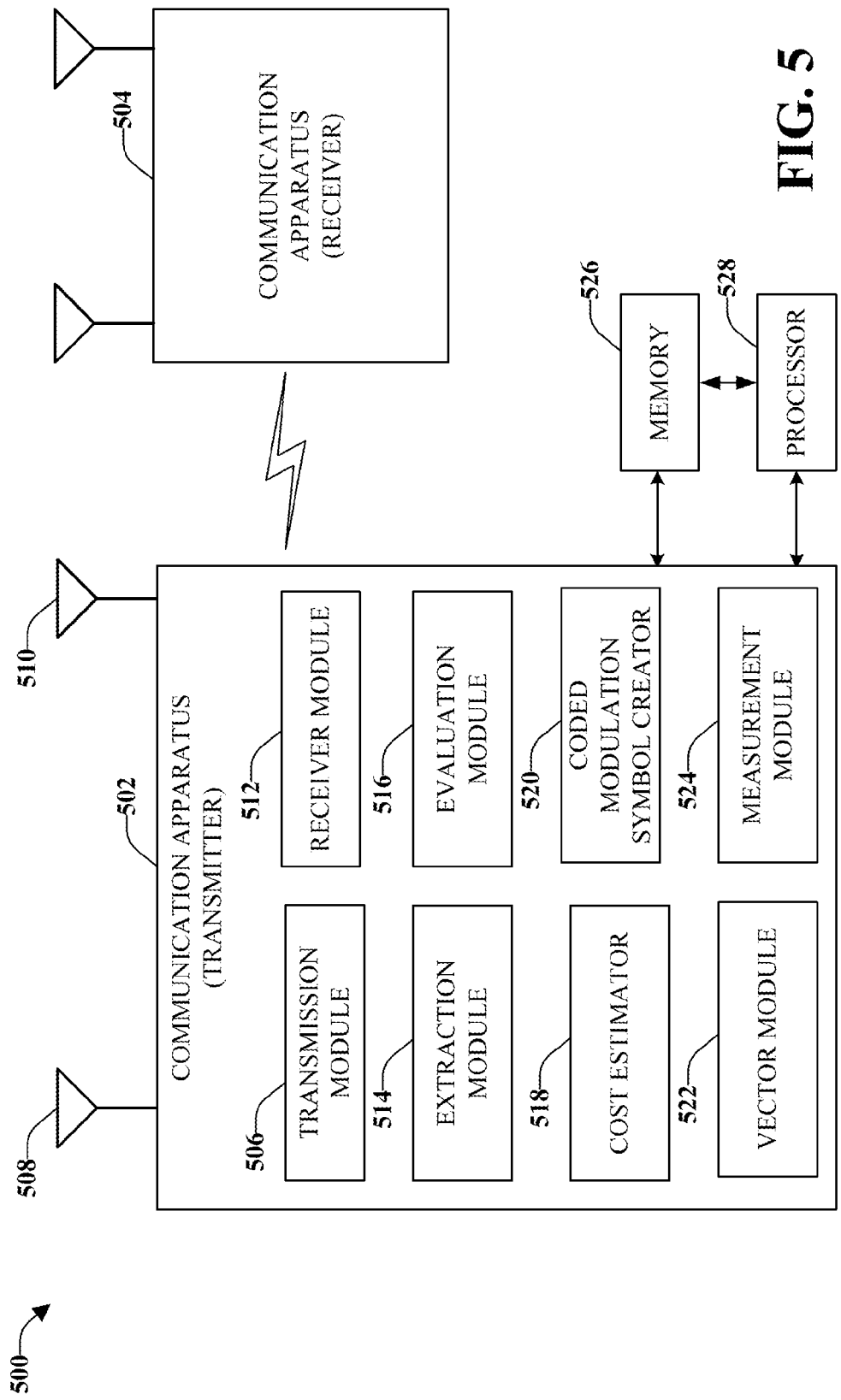
FIG. 5 illustrates a system for transmitting data traffic to mitigate interference in a communication network, according to an aspect.

FIG. 5 illustrates a system 500 for transmitting data traffic to mitigate interference in a communication network, according to an aspect. System 500 includes at least two communication apparatuses 502, 504 that are configured to convey information. It should be understood that multiple transmitter devices 502 and multiple receiver devices 504 can be utilized in system 500 (also referred to as communication network, network, or similar terms). Further, although various aspects will be discussed with reference to a transmitter 502 and a receiver 504 performing separate functions, it should be understood that both transmitter 502 and receiver 504 can perform dual functions of both transmitting and receiving.

Transmitter 502 sends a first transmission request signal with first transmit beamforming vector and a second transmission request signal with second transmit beamforming vector in a transmission request block. Receiver 504 estimates SINRs of the MIMO channels associated with the receive beamforming vectors and determines whether to return request response signals. Based on received request response signals, transmitter 502 decides to transmit streams of data using the corresponding transmit beamforming vectors in the data burst. When channel side information is available only at receiver 504, transmitter 502 sends one transmission request signal. Receiver 504 estimates the SINRs of the MIMO channels associated with receive beamforming vectors using MMSE and/or successive interference cancellation (SIC), and returns request response signals in the request response block.

In further detail, transmitter 502 includes a transmitter module 506 that is configured to send a first transmission request signal with a first beamforming vector and a second transmission request signal with a second beamforming vector. The first and second transmission request signals can be transmitted by two antennas 508, 510. In accordance with some aspects, first and second transmission request signals are transmitted in two distinct channel resources, wherein one channel resource corresponds to at least one tone in an OFDM symbol, for example, 406 and 410 to be transmitted by Node A 202, or 408 and 412 for Node C 206. A receiver module 512 receives signals, at the two antennas 508, 510 in a subsequent request response interval, for example, 414 and 418 to be received by Node A 202, or 416 and 420 for Node C 206.

An extraction module 514 is configured to recover from the received signals at least one request response signal from receiver 504. The response signal can correspond to the first transmission request signal and the second transmission request signal. As a function of the recovered request response signal, an evaluation module 516 can determine whether to send a data traffic signal to receiver 504. If sent, the data traffic signal is conveyed by transmitter module 506.

According to some aspects, the received signals include a first signal and a second signal that are received in two distinct channel resources that respectively correspond to distinct channel resources in which the first and second transmission request signals are transmitted. The one (or more) request response signal can include a first and a second request response signal that correspond to the first and second transmission request signals respectively. The first request response signal can be recovered by extraction module 514 by applying the first beamforming vector to the first received signal (e.g., 414 received at Node A 202, or 416 received at Node C 206) and the second request response signal (e.g., 418 received at Node A 202, or 420 received at Node C) can be recovered by applying the second beamforming vector to the second received signal.

Transmitter 502 can also include a cost estimator 518 that is configured to estimate interference cost amounts associated with each transmission request signal. The determination by evaluation module 516 of whether to send data traffic signals can be a function of one or more of the estimated interference cost amounts. For example, it might be determined to transmit a first data traffic signal if the recovered first request response signal is positive and the estimated first interference cost amount is below a certain threshold. The recovered first request response signal is positive if the power of the recovered first request response signal exceeds a threshold.

In accordance with some aspects, transmitter 502 includes a coded modulation symbol creator 520 that is configured to generate coded modulation symbols. For example, coded modulation symbol creator 520 can generate a first set of coded modulation symbols from a first set of data information. A first beamforming vector is applied to the first set of coded modulation symbols, by a vector module 522, to generate the first data traffic signal, which is transmitted by transmitter module 506 in the channel resources of a traffic channel segment at the two antennas 508, 510.

Further, coded modulation symbol creator 520 can generate a second set of coded modulation symbols from a second set of data information. Vector module 522 applies the second beamforming vector to the second set of coded modulation symbols to generate the second data traffic signal, which is sent by transmission module 506 in the channel resources of the same traffic channel segment as the first data traffic signal.

In accordance with some aspects, receiver module 512 receives an interfering request response signal, at the two antennas 508, 510 in the request response time interval. The interfering transmission request signal can be a higher priority than the first request response signal from receiver 504. For example, in FIG. 4, Node C receives the first and second request response signals 416 and 420 from Node D and, in addition, the interfering request response signals 414 and 418 from Node B, wherein 414 and 418 are both of higher priority than 416 and 420 (in this example). In this case, when the first beamforming vector is utilized to recover the first request response signal 416 from Node D, vector module 520 of Node C can apply the same first beamforming vector to the received interfering request response signal (414 and 418) received at the two antennas to obtain a first resultant signal. Given the priority among 414, 416, 418, and 420 illustrated in FIG. 4, the two interfering request responses are 414 and 418. The first interference cost amount can be estimated by cost estimator 518 as a function of the power of the first resultant signal. According to some aspects, the interfering request response signal is sent by a third device (Node B) to a fourth device (Node A). The interfering request response signal can indicate that third device intends to receive a data traffic signal from fourth device and will be interfered by the data traffic signal to be sent from transmitter 502 (Node C) to receiver 504 (Node D). Alternatively or additionally, the first interference cost amount is indicative of the power of an interference or SINR to be seen by third device when transmitter 502 transmits a data traffic to receiver 504 using the first beamforming vector. In accordance with some aspects, the first interference cost amount can be estimated as a function of the transmission power of the first transmission request signal.

In accordance with some aspects, it might be determined to transmit a second data traffic signal if the recovered second request response signal is positive (e.g., the second request response signal is successfully detected or recovered) and the estimated second interference cost amount is below a certain threshold. Receiver module 512 receives an interfering request response signal at the two antennas 508, 510. The interfering request response signal can be received in the request response time interval and can be a higher priority than the second request response signal from receiver 504. While the second beamforming vector is utilized to recover the second request response signal 420 from Node D, vector module 522 can apply the second beamforming vector to the received interfering request response signal (414 and 418) received at the two antennas to obtain a second resultant signal. Given the priority among 414, 416, 418, and 420 (illustrated in FIG. 4), the two interfering request responses are 414 and 418. The second interference cost amount can be estimated by cost estimator 518 as a function of the power of the second resultant signal. Further, the second interference cost amount can be estimated as a function of the transmission power of the second transmission request signal. Note that in FIG. 4, request responses 414 and 418 both are of higher priority than request responses 416 and 420. Therefore, when Node C calculates the interference cost of both the first and second request responses 416 and 420, Node C should take into account the received power of both 414 and 418. Since the first and second beamforming vectors are probably different, the interference cost determined for the first request response may be different from that determined for the second request response.

In a different scenario (not illustrated), suppose that the priority order from high to low is transmission request 414, 416, 418, and 420. Then, when Node C calculates the interference cost for the first request response 416, Node C needs to take into account the received power of only 414 (e.g., determining the interference cost to 414 because 414 is of higher priority than 416, but 418 is of lower priority than 416). However, when Node C calculates the interference cost for the second request response 420, Node C needs to take into account the received power of both 414 and 418 (e.g., determining the interference cost to 414 as well as the interference cost to 418 because both 414 and 418 are of higher priority than 420).

Evaluation module 516 can independently determine whether to transmit the first data traffic signal corresponding to the first request response and whether to send the second data traffic signal corresponding to the second request response. Evaluation module 516 may determine to transmit both data traffic signals, only one data traffic signal, or no data traffic signals. Even if the first transmission request may have higher priority than the second transmission request, evaluation module 516 may determine to send the second data traffic signal and not to send the first data traffic signal, as the second interference cost amount may be less than the first interference cost amount because of different beamforming vectors being utilized to determine the first and second interference cost amounts.

According to some aspects, it might be determined to transmit only the first data traffic signal if the recovered second request response signal is negative (e.g., the second request response signal is not successfully detected or recovered, because, for example, insufficient energy is received) or the estimated second interference cost amount is above a certain threshold. Coded modulation symbol creator 520 can generate a first set of coded modulation symbols from a first set of data information. Vector module 522 can apply the first beamforming vector to the first set of coded modulation symbols to generate the first data traffic signal, which can be sent by transmission module 506 in the channel resources of a traffic channel segment at the two antennas 508, 510.

Transmitter 502 can also include a measurement module 524 that is configured to calculate the first and second beamforming vectors for transmitting data traffic to receiver 504 prior to transmitting the first and second transmission request signals.

Additionally, system 500 can include memory 526 operatively coupled to transmitter 502. Memory 526 can be external to transmitter 502 or can reside within transmitter 502. Memory 526 can store information related to transmitting transmission request signals and receiving reply signals. Memory 526 can also store instructions related to recovering request response signals from the reply signals and determining whether to send data traffic signals. Additionally, memory 526 can store other suitable information related to signals transmitted and received in a communication network. A processor 528 can be operatively connected to transmitter 502 (and/or memory 526) to facilitate analysis of information related to interference management in a communication network. Memory 526 can store protocols associated with interference management, taking action to control communication between receiver 504 and transmitter 502, etc., such that system 500 can employ stored protocols and/or algorithms to achieve improved communications in a wireless network as described herein. Processor 528 can be a processor dedicated to analyzing and/or generating information received by transmitter 502, a processor that controls one or more components of system 500, and/or a processor that both analyzes and generates information received by transmitter 502 and controls one or more components of system 500.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks can occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
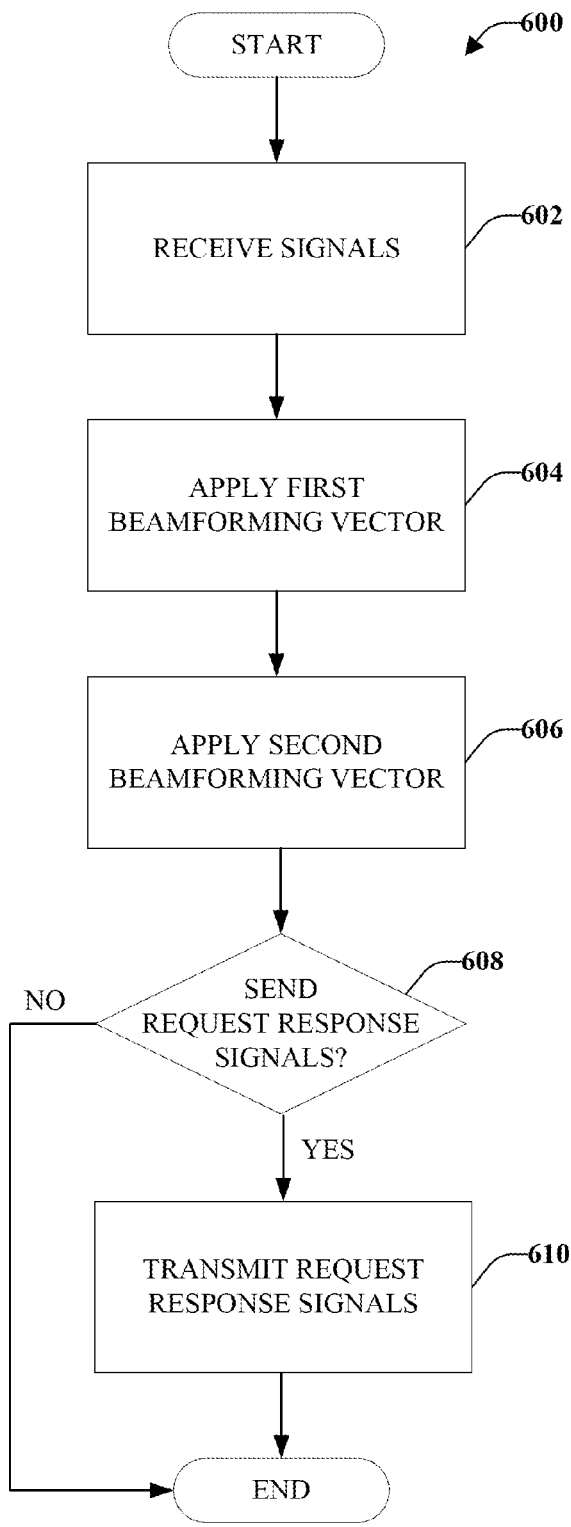
FIG. 6 illustrates a method of operating a first communication device for receiving data traffic from a second communication device in a peer-to-peer communication network, according to an aspect.

FIG. 6 illustrates a method 600 of operating a first communication device for receiving data traffic from a second communication device in a peer-to-peer communication network, according to an aspect. The peer-to-peer communication network can be a MIMO network, wherein at least a subset of devices comprise at least two receive and transmit antennas. A processor executing instructions stored on a computer readable storage medium can be utilized to implement the various methods disclosed herein.

At 602, a first signal and at least a second signal are received. These signals can be intended for first communication device and are received from second communication device, wherein a link is established between the devices. A channel matrix can be known a priori by the devices. The first signal and the second signal can be received in two distinct channel resources. One channel resource can correspond to at least one tone in an OFDM symbol.

At 604, a first beamforming vector is applied to the first signal received at the two (or more) antennas in order to recover a first transmission request signal from second communication device. At 606, a second beamforming vector is applied to the second signal received at the two (or more) antennas to recover a second transmission request signal from second communication device.

A determination is made, at 608, whether to send at least one request response signal to second communication device in a subsequent request response time interval. If it is determined not to send a request response signal ("NO"), method 600 ends. If the determination is to send a request response signal ("YES"), at 610, the at least one request response signal is transmitted to second device.

In accordance with some aspects, to determine, at 608, whether to send one or more request response signals, interference amounts associated with each transmission request signal can be estimated. For example, a first interference amount associated with the first transmission request can be estimated and is indicative of the power of an interference to be seen by first device when first device utilizes a first beamforming vector to receive a data traffic from second device. A second interference amount associated with second transmission request can be estimated and is indicative of a power of an interference to be seen by first device when first device utilizes a second beamforming vector to receive data traffic from second device. The determination whether to send the at least one request response signal can depend on the estimated first interference amount, the second interference amount, or both the first interference amount and the second interference amount.

According to some aspects, the at least one request response signal can include a first request response signal that corresponds to the first transmission request signal. The first request response signal can be determined to be sent if the first interference amount is below a certain threshold. The first request response signal can be transmitted with a first beamforming vector.

In accordance with some aspects, method 600 can further recover an interfering transmission request signal in the transmission request time interval. The interfering transmission request signal can be a higher priority than the first transmission request signal from second device and the first interference amount can be estimated as a function of the power of the recovered interfering transmission request signal. According to some aspects, the interfering transmission request signal can be sent by a third device to a fourth device. The interfering transmission request signal indicates that third device intends to send a data traffic signal to fourth device and will interfere with the data traffic signal to be sent from second device to first device.

According to some aspects, the at least one request response signal can be determined to be sent if the first interference amount is below a certain threshold and if the second interference amount is below the certain threshold. In accordance with some aspects, method 600 can calculate a first and a second beamforming vector for receiving data traffic from the second device prior to receiving the signals at the two (or more) antennas in the transmission request time interval.

Figure 7:
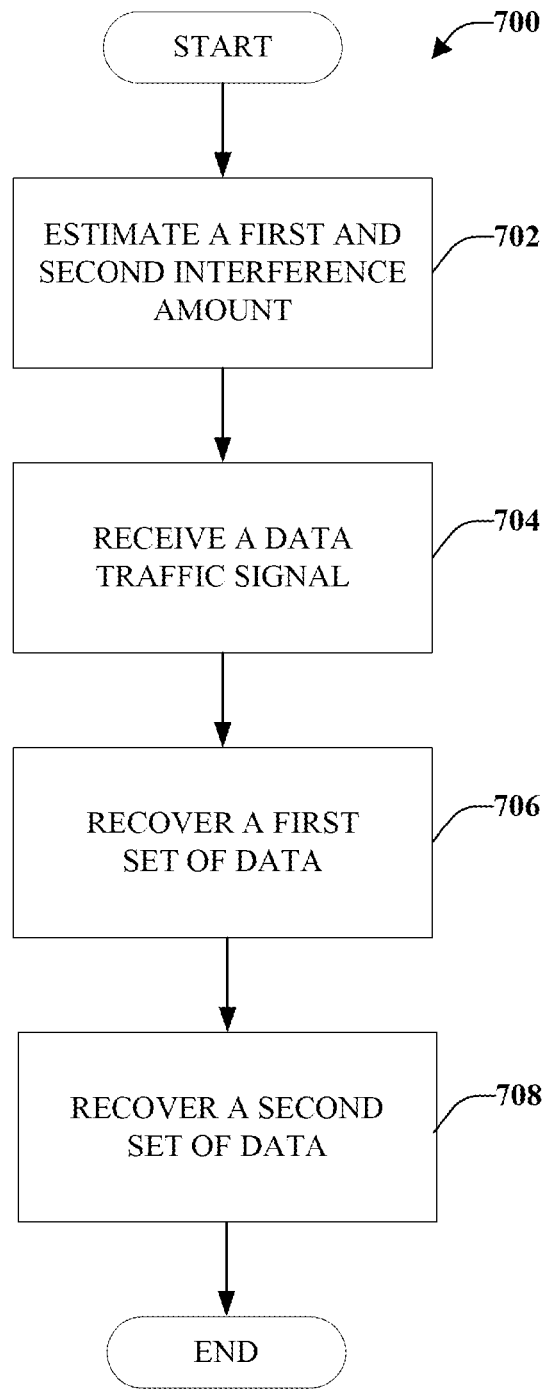
FIG. 7 illustrates a method for receiving data traffic at a first device, wherein the data traffic was sent by a second device, according to an aspect.

FIG. 7 illustrates a method 700 for receiving data traffic at a first device, wherein the data traffic was sent by a second device, according to an aspect. Method 700 can include estimating interference amounts, at 702, in order to determine whether to send at least one request response signal. According to some aspects, the at least one request response signal can include a first request response signal that corresponds to a first transmission request signal. The first request response signal can be determined to be sent if the first interference amount is below a certain threshold. A data traffic signal from the second device is received, at 704, subsequent to transmitting the at least one request response signal. A first beamforming vector can be applied, at 706, to the received data traffic signal to recover a first set of data information.

In accordance with some aspects, the at least one request response signal comprises a second request response signal that corresponds to a second transmission request signal. The second request response signal is determined to be sent if the second interference amount (estimated at 702) is below a certain threshold. The second request response signal is transmitted with a second beamforming vector. The interfering transmission request signal can be a higher priority than the second transmission request signal from the second device and the second interference amount is estimated as a function of a power of the recovered interfering transmission request signal.

According to some aspects, at 704, a data traffic signal is received from second device subsequent to transmitting at least one request response signal. The first beamforming vector can be applied to the received data traffic signal, at 706, to recover a first set of data information. At 708, the second beamforming vector can be applied to the received data traffic signal to recover a second set of data information.

Figure 8:
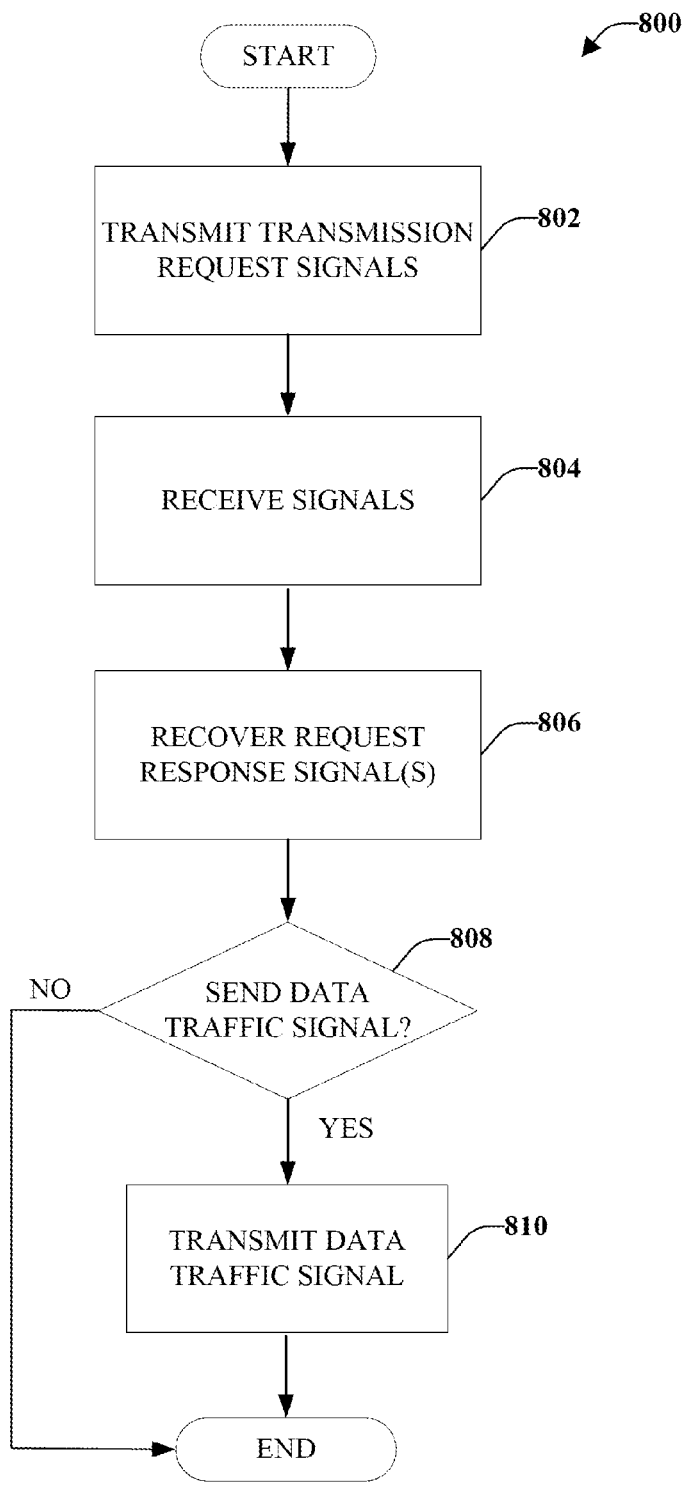
FIG. 8 illustrates a method of operating a first communication device for transmitting data traffic to a second communication device in a multiple-input-multiple-output peer-to-peer communication environment, according to an aspect.

FIG. 8 illustrates a method 800 of operating a first communication device for transmitting data traffic to a second communication device in a multiple-input-multiple-output peer-to-peer communication environment, according to an aspect. The first communication device can be equipped with two or more antennas.

At 802, a first transmission request signal with a first beamforming vector and a second transmission request signal with at least a second beamforming vector are transmitted. The first transmission request signal and the second transmission request signal are transmitted by the two or more antennas. In accordance with some aspects, the first and second transmission request signals are transmitted in two distinct channel resources, wherein one channel resource corresponds to at least one tone in an OFDM symbol.

In reply to the transmission request signals, in a subsequent request response time interval, signals are received, at 804, at the two or more antennas. At 806, at least one request response signal from second communication device is recovered from the received signals. The at least one request response signal corresponds to the first transmission request signal and the second transmission request signal. At 808, a determination whether to send a data traffic signal to the second communication device is made as a function of the recovered request response signal. If the data traffic signal should be sent ("YES") method 800 continues, at 810 and the data traffic signal is transmitted. If the data traffic signal should not be sent ("NO"), method 800 ends (or returns to 806 with another determination).

In accordance with some aspects, the received signals include a first signal and a second signal received in two distinct channel resources that respectively correspond to the distinct channel resources in which the first and second transmission request signals are transmitted. The at least one request response signal includes a first request response signal and a second request response signal that correspond to the first and second transmission request signals respectively. The first request response signal can be recovered by applying the first beamforming vector to the first received signal and the second request response signal can be recovered by applying the second beamforming vector to the second received signal.

Alternatively or additionally, method 800 includes calculating the first and second beamforming vectors for transmitting data traffic to second communication device before transmitting the first and second transmission request signals.

Figure 9:
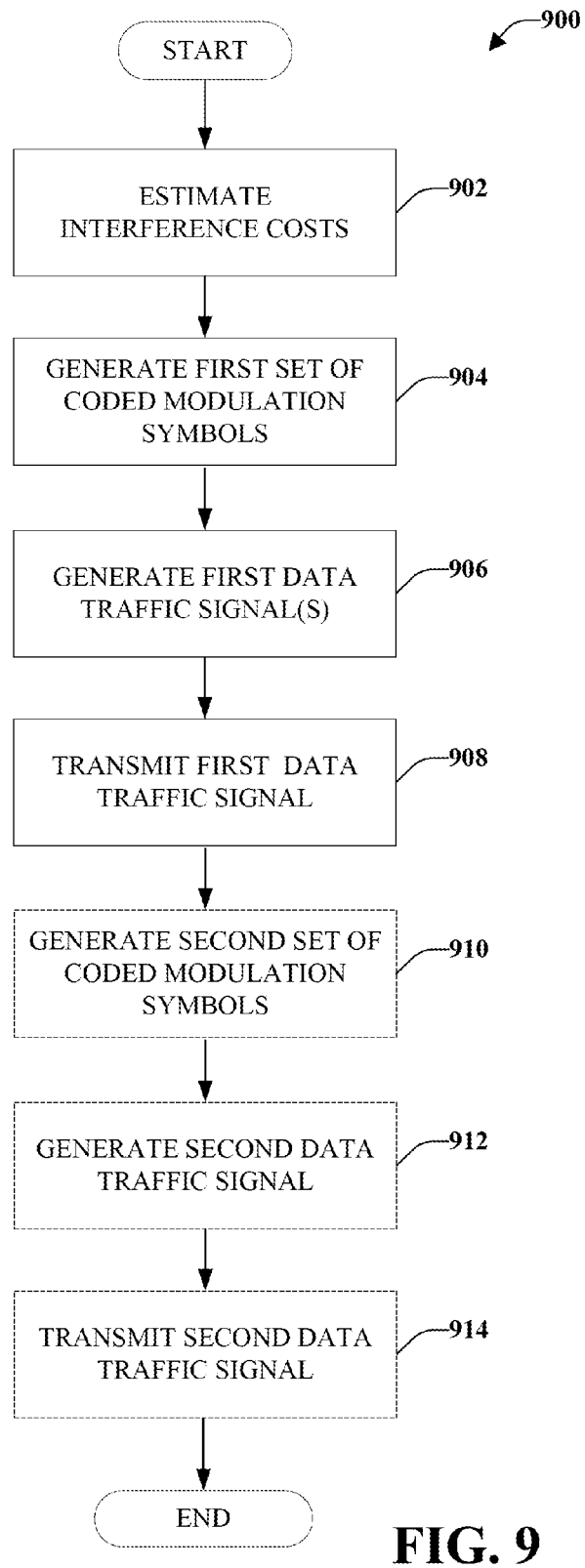
FIG. 9 illustrates a method for transmitting data traffic from a first device to a second device, according to an aspect.

FIG. 9 illustrates a method 900 for transmitting data traffic from a first device to a second device, according to an aspect At 902, a first interference cost amount associated with a first transmission request signal and a second interference cost amount associated with a second transmission request signal are estimated. A determination whether to send the data traffic signals (e.g., element 808 of FIG. 8) depends on at least one of the estimated first and second interference cost amounts. It can be determined to transmit a first data traffic signal if the recovered first request response signal is positive and the estimated first interference cost amount is below a certain threshold. The recovered first request response signal is positive if the power of the recovered first request response signal exceeds a threshold.

Method 900 can continue, at 904, when a first set of coded modulation symbols is generated from a first set of data information. A first beamforming vector is applied, at 906, to the first set of coded modulation symbols to generate the first data traffic signal. At 908, the first data traffic signal is transmitted in the channel resources of a traffic channel segment at two or more antennas.

In accordance with some aspects, method 900 continues, at 910, when a second set of coded modulation symbols is generated from a second set of data information. A second beamforming vector is applied, at 912, to the second set of coded modulation symbols to generate the second data traffic signal. At 914, the second data traffic signal is transmitted at the at least two antennas. The second data traffic signal is transmitted in the channel resources of the same traffic segment as the first data traffic signal.

Figure 10:
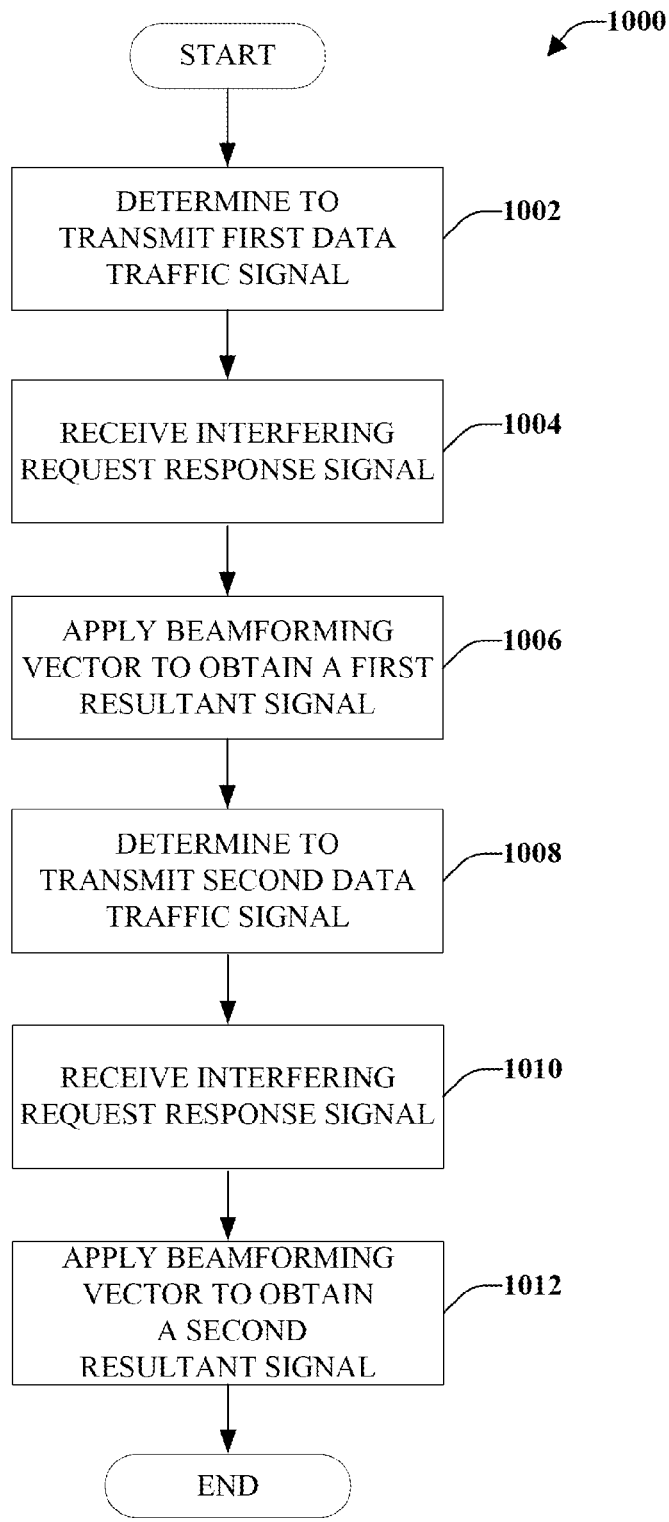
FIG. 10 illustrates a method for transmitting data traffic between a first device and a second device, according to an aspect.

FIG. 10 illustrates a method 1000 for transmitting data traffic between a first device and a second device, according to an aspect. In accordance with some aspects, at 1002, it is determined to transmit a first data traffic signal. The first data traffic signal might be sent if a recovered first request response signal is positive and an estimated first interference cost amount is below a certain threshold.

At 1004, an interfering request response signal is received at the two or more antennas. The interfering request response signal is received in the request response time interval. The interfering transmission request signal might be a higher priority than a first request response signal received from the second device. A beamforming vector is applied, at 1006, to the received interfering request response signal to obtain a first resultant signal. The first interference cost amount is estimated as a function of the power of the first resultant signal.

In accordance with some aspects, the interfering request response signal is sent by a third device to a fourth device. The interfering request response signal indicates that third device intends to receive a data traffic signal from fourth device and will be interfered by the data traffic signal to be sent from first device to second device. According to some aspects the first interference cost amount is indicative of a power of an interference to be seen by third device when first device transmits a data traffic to second device using the first beamforming vector. The first interference cost amount can further be estimated as a function of the transmission power of the first transmission request signal.

Additionally, it can be determined, at 1008 to transmit a second data traffic signal if the recovered second request response signal is positive and the estimated second interference cost amount is below a certain threshold. At 1010, an interfering request response signal is received at the at least two antennas in the request response time interval. The interfering transmission request signal could be a higher priority than the second request response signal from the second device.

At 1012, a second beamforming vector is applied to the received interfering request response signal to obtain a second resultant signal. The second interference cost amount can be estimated as a function of the power of the second resultant signal. According to some aspects, the second interference cost amount can further be estimated as a function of the transmission power of the second transmission request signal.

In accordance with some aspects, it might be determined to transmit only the first data traffic signal. This determination can be made if the recovered second request response signal is negative or the estimated second interference cost amount is above a certain threshold. In this case, method 1000 can generate a first set of coded modulation symbols from a first set of data information and apply the first beamforming vector to the first set of coded modulation symbols to generate the first data traffic signal. The first data traffic signal is transmitted in the channel resources of a traffic channel segment at the at least two antennas.

Figure 11:
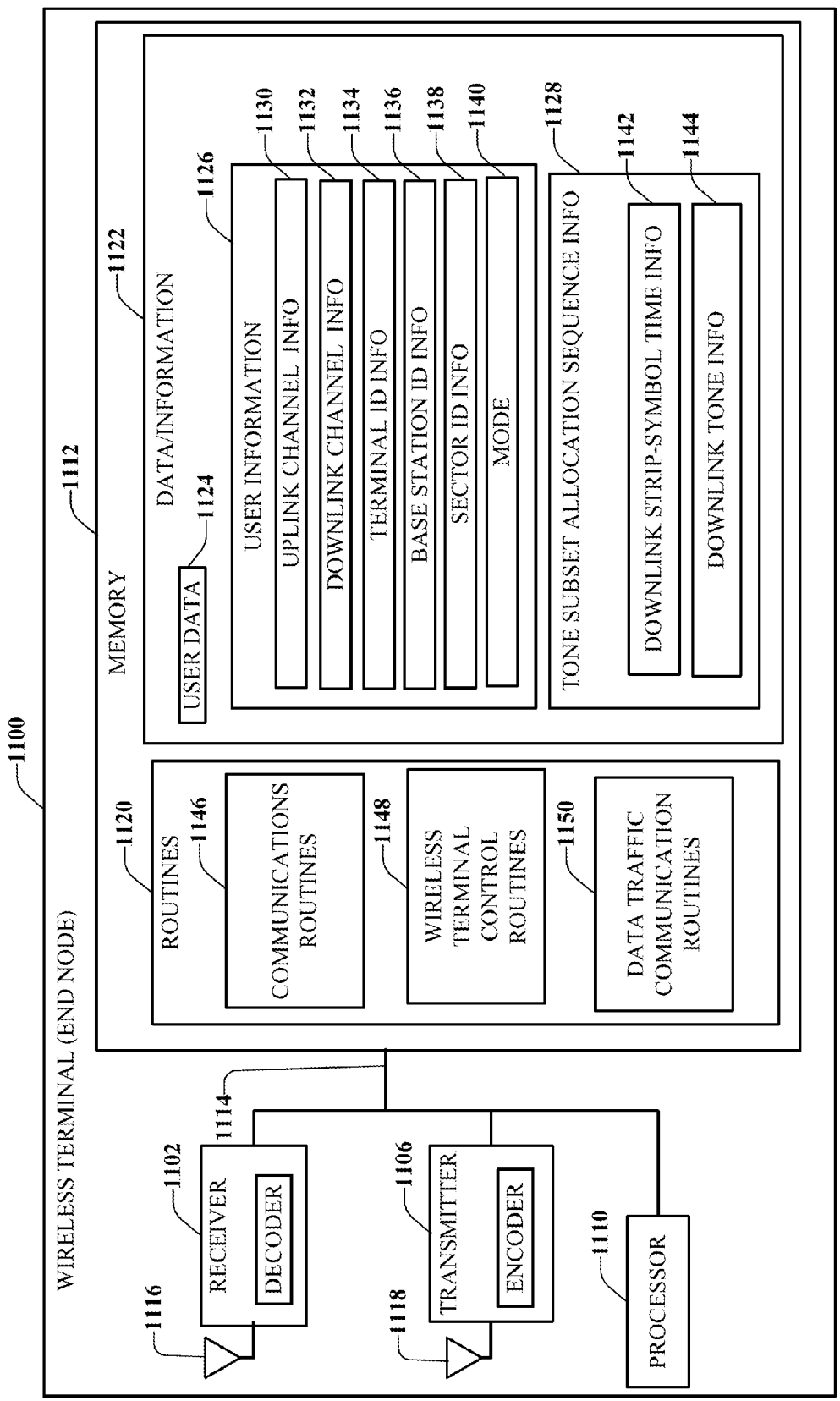
FIG. 11 illustrates an example wireless terminal, which can be used as any one of the wireless terminals described herein.

FIG. 11 illustrates an example wireless terminal (e.g., mobile device, transmitting device, receiving device, and so forth) 1100, which can be used as any one of the wireless terminals (e.g., mobile devices, transmitting device, receiving device, and so on) described herein. According to various aspects, wireless terminal 1100 facilitates selection of a multiple antenna scheme for data exchange in a communications network as a function of network conditions. Wireless terminal 1100 includes a receiver 1102 that includes a decoder 1104, a transmitter 1106 that includes an encoder 1108, a processor 1110, and a memory 1112 which are coupled together by a bus 1114 over which the various elements 1102, 1106, 1110, 1112 can interchange data and information. An antenna 1116 used for receiving signals from a transmitting device is coupled to receiver 1102. An antenna 1118 used for transmitting signals (e.g., to a receiving device, to a peer node) is coupled to transmitter 1106. Processor 1110 (e.g., a CPU) controls operation of wireless terminal 1100 and implements methods by executing routines 1120 and using data/information 1122 in memory 1112.

Data/information 1122 includes user data 1124, user information 1126, and tone subset allocation sequence information 1128. User data 1124 can include data, intended for a peer node, which will be routed to encoder 1108 for encoding prior to transmission by transmitter 1106, and data received from a peer node, which has been processed by decoder 1104 in receiver 1102. User information 1126 includes uplink channel information 1130 and downlink channel information 1132. Uplink channel information 1130 includes information identifying uplink channels segments that have been assigned for wireless terminal 1100 to use when transmitting information. Uplink channels can include uplink traffic channels, dedicated uplink control channels (e.g., request channels, power control channels and timing control channels). Each uplink channel includes one or more logic tones, each logical tone following an uplink tone hopping sequence. The uplink hopping sequences are different between each sector type of a cell and between adjacent cells. Downlink channel information 1132 includes information identifying downlink channel segments that have been assigned to wireless terminal 1100 for use when receiving data/information. Downlink channels may include downlink traffic channels and assignment channels, each downlink channel including one or more logical tone, each logical tone following a downlink hopping sequence, which is synchronized between each sector of the cell.

User information 1126 also includes terminal ID information 1134, which is an assigned identification, base station ID information 1136, which identifies the specific base station that wireless terminal 1100 might have established communications with, and sector ID info 1138, which identifies the specific sector of the cell where wireless terminal 1100 is presently located. Base station ID 1136 provides a cell slope value and sector ID info 1138 provides a sector index type; the cell slope value and sector index type may be used to derive tone hopping sequences. Mode information 1140, also included in user information 1126, identifies whether the wireless terminal 1100 is in sleep mode, hold mode, on mode, and so forth.

Tone subset allocation sequence information 1128 includes downlink strip-symbol time information 1142 and downlink tone information 1144. Downlink strip-symbol time information 1142 includes frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1144 includes information including a carrier frequency assigned to the base station, the number and frequency of tones, and the set of tone subsets to be allocated to the strip-symbol periods, and other cell and sector specific values such as slope, slope index and sector type.

Routines 1120 include communications routines 1146 and wireless terminal control routines 1148. Communications routines 1146 control the various communications protocols used by wireless terminal 1100. For example, communications routines 1146 can enable communicating through a wide area network and/or a local area peer-to-peer network (e.g., directly with disparate wireless terminal(s)). By way of further example, communications routines 1146 can enable receiving a broadcast signal. Wireless terminal control routines 1148 control basic wireless terminal 1100 functionality including the control of the receiver 1102 and transmitter 1106.

Routines 1120 can also include data traffic communication routines 1150. Data traffic communication routines 1150 can selectively transmit and/or receive data traffic from a peer device. For transmitting data traffic, data traffic communication routines 1150 can transmit a first transmission request signal with a first beamforming vector and a second transmission request signal with a second beamforming vector. Signals can be received (at two or more antennas) in a subsequent request response time interval and at least one request response signal can be recovered from the received signals. As a function of the recovered request response signal, a determination whether to send a data traffic signal can be made.

For receiving data traffic, data traffic communication routines 1150 can include receiving a first and a second signal (at two or more antennas) in a transmission request time interval. A first beamforming vector is applied to the first signal to recover a first transmission request signal and a second beamforming vector is applied to the second signal to recover a second transmission request signal. In a subsequent request response time interval one or more request response signals can be transmitted, if it is determined to send the request response signals.

Figure 12:
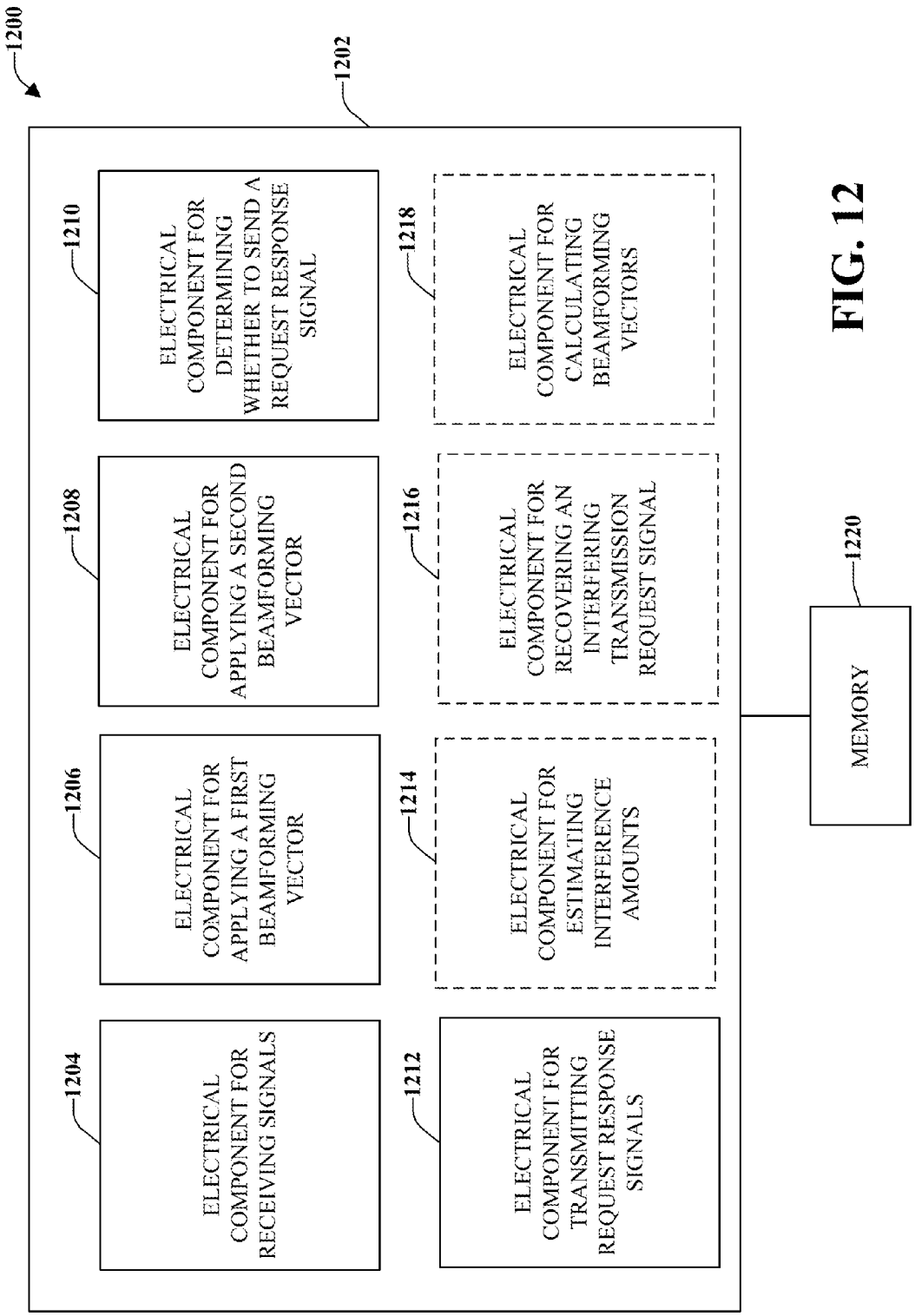
FIG. 12 illustrates a system that manages interference in a MIMO peer-to-peer network, according to an aspect.

With reference to FIG. 12, illustrated is a system 1200 that manages interference in a MIMO peer-to-peer network, according to an aspect. System 1200 can reside at least partially within a mobile device. It is to be appreciated that system 1200 is represented as including functional blocks, which may be functional blocks that represent functions implemented by a processor, software, or combination thereof (e.g., firmware).

System 1200 includes a logical grouping 1202 of electrical components that can act separately or in conjunction. Logical grouping 1202 can include an electrical component 1204 for receiving signals from a second communication device at two or more antennas of mobile device. Received signals can include a first signal and a second signal that are received in a transmission request time interval. In accordance with some aspects, the first signal and the second signal are received in two distinct channel resources. One channel resource corresponds to at least one tone in an OFDM symbol.

Also included in logical grouping 1202 is an electrical component 1206 for applying a first beamforming vector to the first signal to recover a first transmission request signal. Also included is an electrical component 1208 for applying a second beamforming vector to the second signal to recover a second transmission request signal.

Further, logical grouping 1202 includes an electrical component 1210 for determining whether to send at least one request response signal to the second communication device in a subsequent request response time interval. Also included is an electrical component 1212 for transmitting the at least one request response signal to the second communication device if it is determined to send the request response signals.

In accordance with some aspects, logical grouping 1202 includes an electrical component 1214 for estimating a first interference amount and a second interference amount. The first interference amount is associated with the first transmission request signal and the second interference amount is associated with the second transmission request signal. Electrical component 1210 for determining whether to sent the at least one response signal can make the determination as a function of the estimated first interference amount, the estimated second interference amount, or combinations thereof.

According to some aspects, logical grouping 1202 includes an electrical component 1216 for recovering an interfering transmission request signal in the transmission request time interval. The interfering transmission request signal can be a higher priority than the first transmission request signal from the second device. Further, the first interference amount is estimated as a function of the power of the recovered interfering transmission request signal. The interfering transmission request signal can be sent from a third device to a fourth device.

In accordance with some aspects, electrical component 1204 for receiving signals can receive a data traffic signal after electrical component 1212 for transmitting sends the at least one request response signal. Electrical component 1206 for applying the first beamforming vector applies the first beamforming vector to the received data traffic signal to recover a first set of data information.

According to another aspect, electrical component 1204 receives a data traffic signal after electrical component 1212 transmits at least one request response signal. Electrical component 1206 applies the first beamforming vector to the received data traffic signal to recover a first set of data information. Further, electrical component 1208 applies the second beamforming vector to the received data traffic signal to recover a second set of data information.

Further, in accordance with some aspects, logical grouping 1202 includes an electrical component 1218 for calculating a first and a second beamforming vectors for receiving data traffic from the second device before electrical component 1204 receives the signals at the two antennas in the transmission request time interval.

Additionally, system 1200 can include a memory 1220 that retains instructions for executing functions associated with electrical components 1204-1218. While shown as being external to memory 1220, it is to be understood that one or more of electrical components 1204-1218 can exist within memory 1220.

Figure 13:
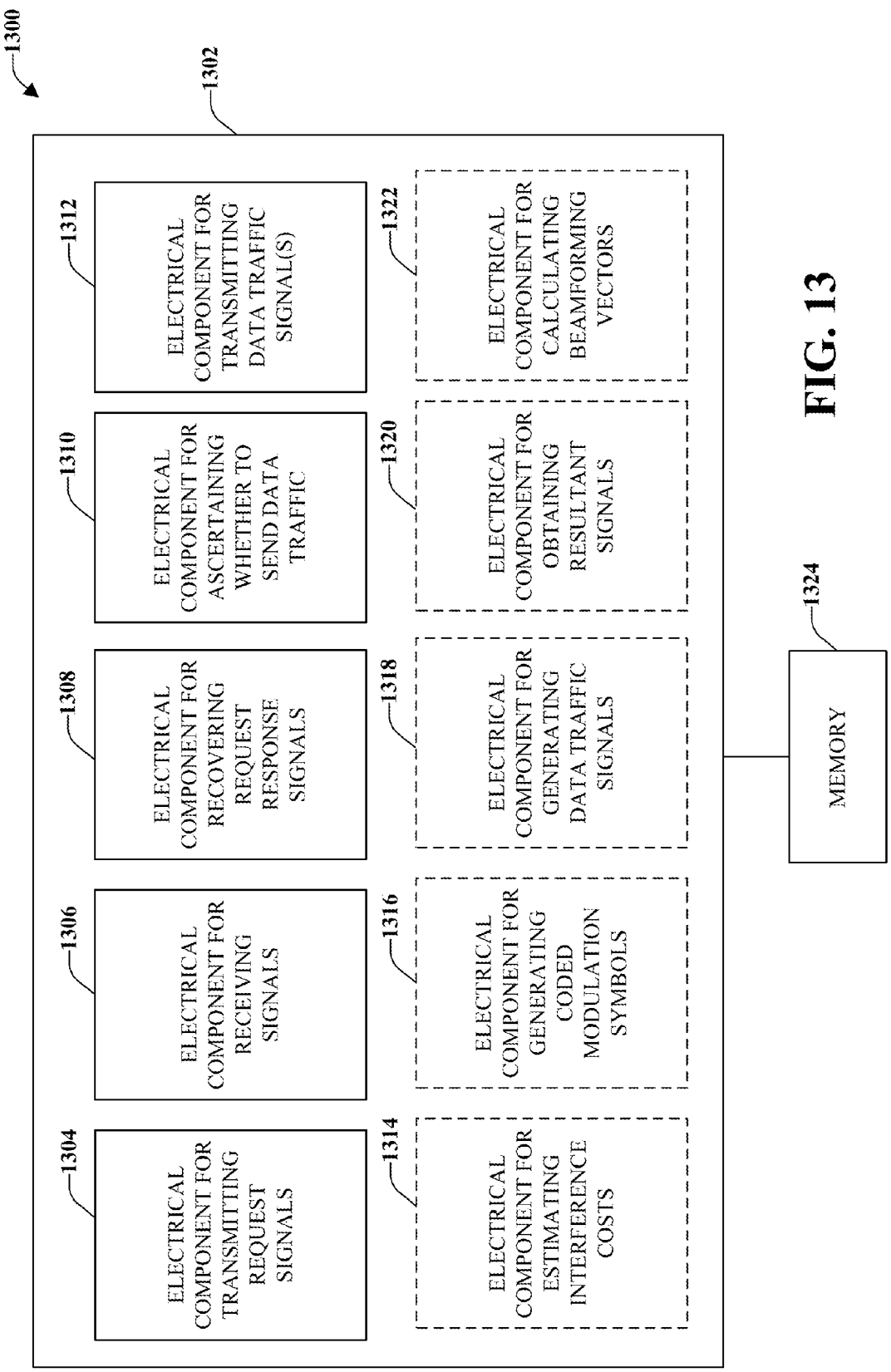
FIG. 13 illustrates a system that manages interference, according to an aspect.

FIG. 13 illustrates a system 1300 that manages interference, according to an aspect. System 1300 can reside at least partially within a mobile device. It is to be appreciated that system 1300 is represented as including functional blocks, which can be functional blocks that represent functions implemented by a processor, software, or combination thereof (e.g., firmware).

System 1300 includes a logical grouping 1302 of electrical components that can act separately or in conjunction. Included in logical grouping 1302 is an electrical component 1304 for transmitting a first transmit request signal with a first beamforming vector and at least a second transmit request signal with at least a second beamforming vector. The first and second transmission request signals are transmitted by two or more antennas associated with mobile device. Also included is an electrical component 1306 for receiving signals at the two or more antennas in a subsequent request response time interval.

Logical grouping 1302 also includes an electrical component 1308 for recovering from the received signals at least one request response signal, which corresponds to the first transmission request signal and the second transmission request signal. Also included is an electrical component 1310 for ascertaining whether to send a data traffic signal as a function of the recovered request response signal and an electrical component 1312 for transmitting the data traffic signal if it is determined to send the data traffic signal. The wireless communications apparatus of claim 50, wherein the first transmission request signal and the second transmission request signal are transmitted in two distinct channel resources, one channel resource corresponds to at least one tone in an OFDM symbol.

In accordance with some aspects, the received signals include a first signal and a second signal received in two distinct channel resources that respectively correspond to the distinct channel resources in which the first and second transmission request signals are transmitted. According to some aspects, one channel resource can corresponds to at least one tone in an OFDM symbol. The at least one request response signal includes a first and a second request response signals that correspond to the first and second transmission request signals respectively. The first request response signal is recovered by applying the first beamforming vector to the first received signal and the second request response signal is recovered by applying the second beamforming vector to the second received signal.

In accordance with some aspects, logical grouping includes an electrical component 1314 for estimating interference costs. A first interference cost amount is associated with the first transmission request signal and a second interference cost amount is associated with the second transmission request signal.

Alternatively or additionally, logical grouping can include an electrical component 1316 for generating coded modulation symbols and an electrical component 1318 for generating data traffic signals. Electrical component 1316 can generate a first set of coded modulation symbols from a first set of data information and electrical component 1318 can apply a first beamforming vector to the first set of coded modulation symbols to generate a first data traffic signal. Electrical component 1312 can transmit the first data traffic signal in the channel resources of a traffic channel segment at the at least two antennas.

Further, electrical component 1316 can generate a second set of coded modulation symbols for a second set of data information and electrical component 1318 can apply the second beamforming vector to the second set of coded modulation symbols to generate a second data traffic signal. Electrical component 1312 can transmit the second data traffic signal at the at least two antennas. The second data traffic signal can be transmitted in the channel resources of the same traffic channel segment as the first data traffic signal.

In accordance with some aspects, electrical component 1304 receives an interfering request response signal at the at least two antennas in the request response time interval. The interfering transmission request signal can be a higher priority than the first request response signal. An electrical component 1320 for obtaining resultant signals can apply the beamforming vector to the received interfering request response signal to obtain a first resultant signal. The first interference cost amount is estimated as a function of the power of the first resultant signal.

According to some aspects, electrical component 1304 receives an interfering request response signal at the at least two antennas in the request response time interval. The interfering transmission request response signal can be a higher priority than the second request response signal. Electrical component 1320 applies the second beamforming vector to the received interfering request response signal to obtain a second resultant signal. The second interference cost amount is estimated as a function of the power of the second resultant signal.

In accordance with another aspect, it can be determined to transmit only the first data signal if the recovered second request response signal is negative or the estimated second interference cost amount is above a certain threshold. In this case, electrical component 1316 generates a first set of coded modulation symbols from a first set of data information. Electrical component 1318 applies the first beamforming vector to the first set of coded modulation symbols to generate the first data traffic signal and electrical component 1312 transmits the first data traffic signal in the channel resources of a traffic channel segment at the at least two antennas.

Alternatively or additionally, logical grouping 1302 includes an electrical component 1322 for calculating the first and the second beamforming vectors for transmitting data traffic before electrical component 1312 transmits the first and the second transmission request signals.

Additionally, system 1300 can include a memory 1324 that retains instructions for executing functions associated with electrical components 1304-1324 or other components. While shown as being external to memory 1324, it is to be understood that one or more of electrical components 1304-1324 may exist within memory 1324.

Figure 14:
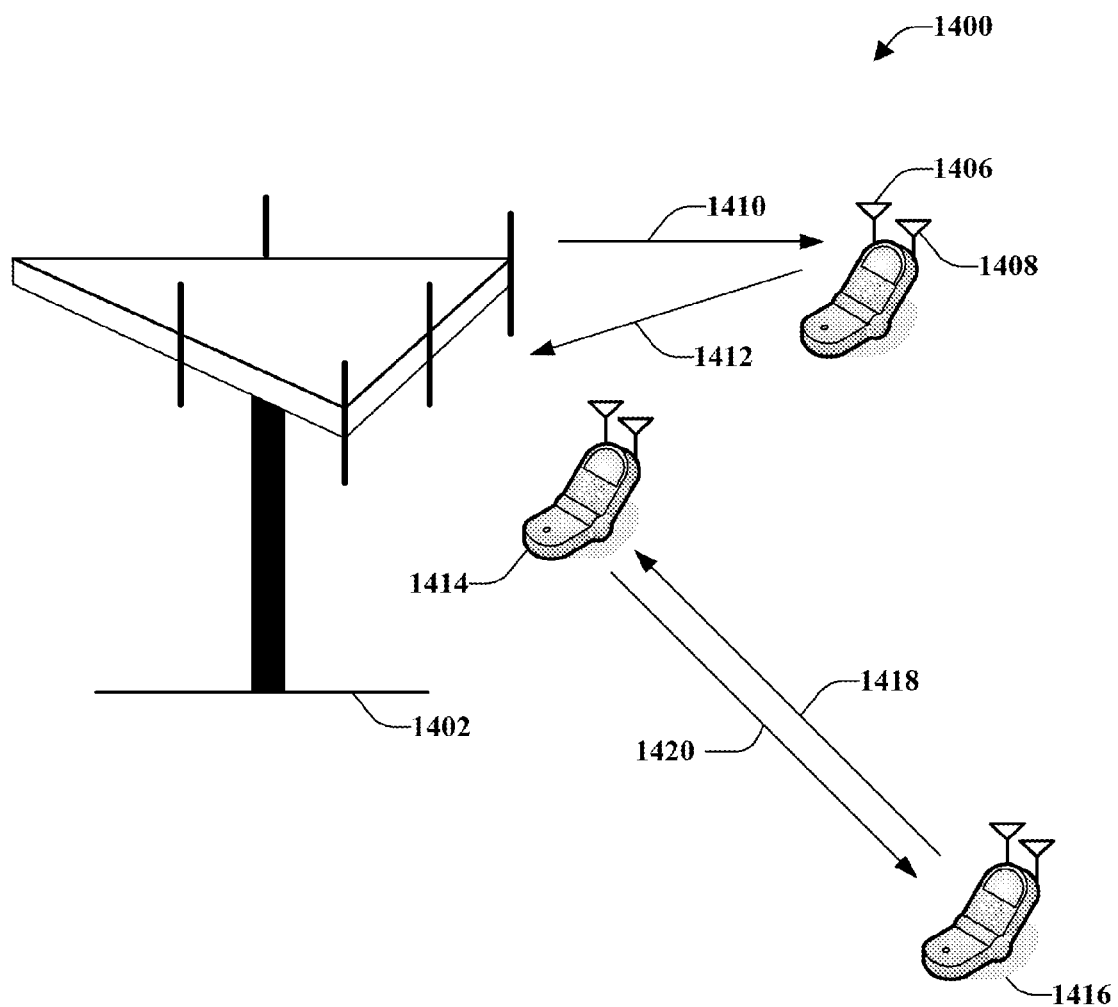
FIG. 14 illustrates a wireless communication system in accordance with various aspects.

Referring now to FIG. 14, illustrated is a wireless communication system 1400 in accordance with various aspects. System 1400 comprises a base station 1402 that can include a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Additionally, base station 1402 can be a home base station, a Femto base station, and/or the like.

Base station 1402 can communicate with one or more devices such as device 1404; however, it is to be appreciated that base station 1402 can communicate with substantially any number of devices. As depicted, device 1404 is equipped with multiple antennas, such as antennas 1406 and 1408, where antennas 1406 and 1408 transmit information to base station 1402 over a reverse link 1410 and receive information from base station 1402 over a forward link 1412. In a frequency division duplex (FDD) system, forward link 1412 can utilize a different frequency band than that used by reverse link 1410, for example. Further, in a time division duplex (TDD) system, forward link 1412 and reverse link 1410 can utilize a common frequency band.

In addition, devices 1414 and 1416 can be communicating with one another, such as in a peer-to-peer configuration. Moreover, device 1414 and 1416 are equipped with multiple antennas are in communication using links 1418 and 1420. In a peer-to-peer ad hoc network, devices within range of each other, such as devices 1414 and 1416, communicate directly with each other without a base station 1402 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

A communication network can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

Figure 15:
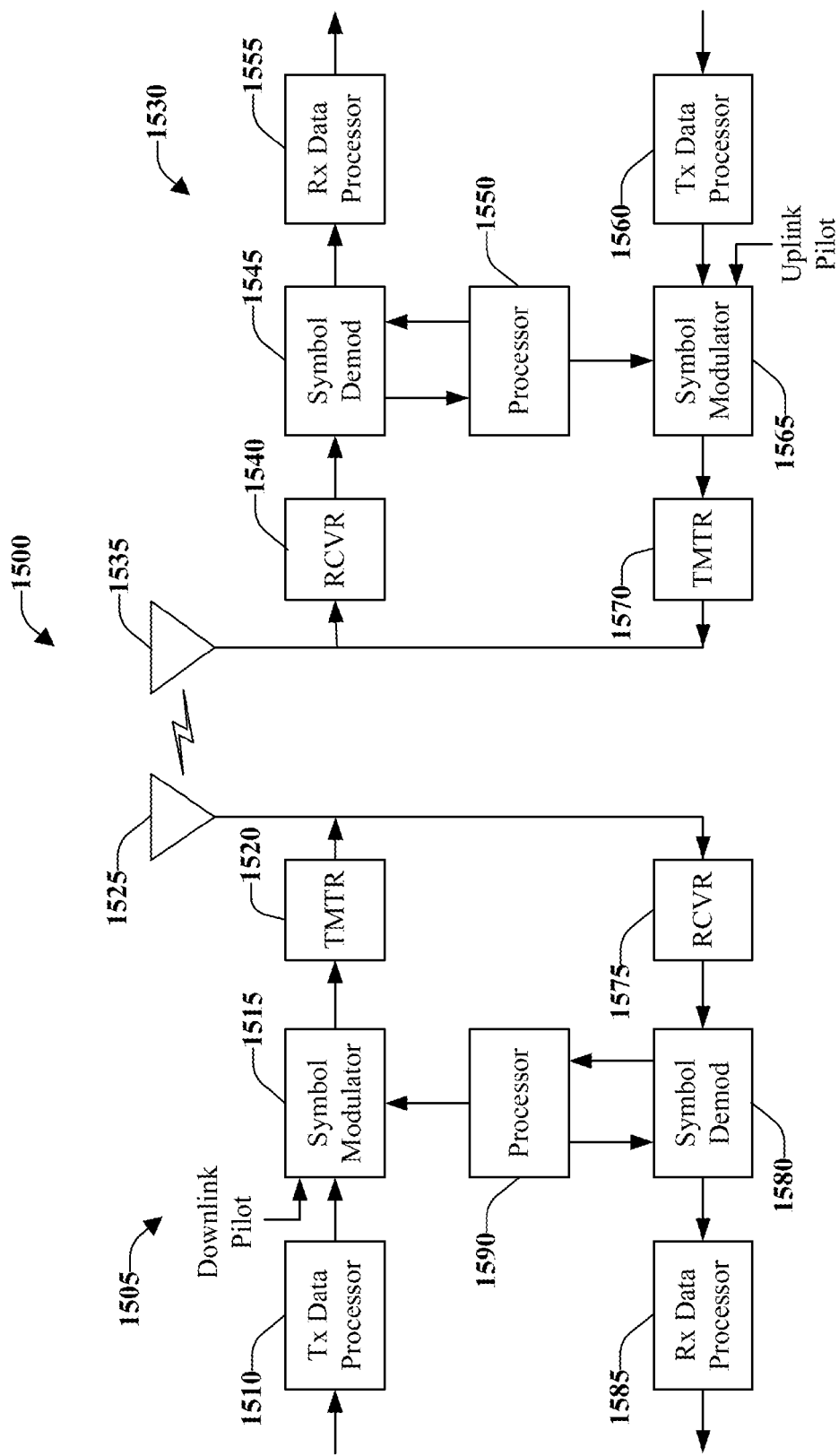
FIG. 15 illustrates an exemplary wireless communication system, according to various aspects.

FIG. 15 illustrates an exemplary wireless communication system 1500, according to various aspects. Wireless communication system 1500 depicts one base station and one terminal for sake of brevity. However, it is to be appreciated that system 1500 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 15, on a downlink, at access point 1505, a transmit (TX) data processor 1510 receives, formats, codes, interleaves, and modulates (or symbol maps) traffic data and provides modulation symbols ("data symbols"). A symbol modulator 1515 receives and processes the data symbols and pilot symbols and provides a stream of symbols. A symbol modulator 1515 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 190 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 195 to the terminals. At terminal 1530, an antenna 1535 receives the downlink signal and provides a received signal to a receiver unit (RCVR) 1540. Receiver unit 1540 conditions (e.g., filters, amplifies, and frequency downconverts) the received signal and digitizes the conditioned signal to obtain samples. A symbol demodulator 1545 obtains N received symbols and provides received pilot symbols to a processor 1550 for channel estimation. Symbol demodulator 1545 further receives a frequency response estimate for the downlink from processor 1550, performs data demodulation on the received data symbols to obtain data symbol estimates (which are estimates of the transmitted data symbols), and provides the data symbol estimates to an RX data processor 1555, which demodulates (i.e., symbol demaps), deinterleaves, and decodes the data symbol estimates to recover the transmitted traffic data. The processing by symbol demodulator 1545 and RX data processor 1555 is complementary to the processing by symbol modulator 1515 and TX data processor 1510, respectively, at access point 1505.

On the uplink, a TX data processor 1560 processes traffic data and provides data symbols. A symbol modulator 1565 receives and multiplexes the data symbols with pilot symbols, performs modulation, and provides a stream of symbols. A transmitter unit 1570 then receives and processes the stream of symbols to generate an uplink signal, which is transmitted by the antenna 1535 to the access point 1505.

At access point 1505, the uplink signal from terminal 1530 is received by the antenna 195 and processed by a receiver unit 1575 to obtain samples. A symbol demodulator 1580 then processes the samples and provides received pilot symbols and data symbol estimates for the uplink. An RX data processor 1585 processes the data symbol estimates to recover the traffic data transmitted by terminal 1530. A processor 1590 performs channel estimation for each active terminal transmitting on the uplink.

Processors 1590 and 1550 direct (e.g., control, coordinate, manage, . . . ) operation at access point 1505 and terminal 1530, respectively. Respective processors 1590 and 1550 can be associated with memory units (not shown) that store program codes and data. Processors 1590 and 1550 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof With software, implementation can be through modules (e.g., procedures, functions, and so on) that perform the functions described herein. The software codes may be stored in memory unit and executed by the processors 1590 and 1550.

It is to be understood that the aspects described herein may be implemented by hardware, software, firmware or any combination thereof When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method of operating a first communication device for receiving data traffic from a second communication device in a peer-to-peer communication network, the first communication device is equipped with at least two antennas, the method comprising:
receiving a first signal and a second signal at the at least two antennas in a transmission request time interval, wherein the first signal and the second signal are received in two distinct channel resources, one channel resource corresponds to at least one tone in an OFDM symbol;
applying a first beamforming vector to the first signal received at the at least two antennas to recover a first transmission request signal from the second communication device;
applying a second beamforming vector to the second signal received at the at least two antennas to recover a second transmission request signal from the second communication device;
determining whether to send at least one request response signal to the second communication device in a subsequent request response time interval; and
transmitting the at least one request response signal to the second device if it is determined to send the request response signals.

2. The method of claim 1, further comprising:
estimating a first interference amount associated with the first transmission request signal and a second interference amount associated with the second transmission request signal, wherein the determination of whether to send the at least one request response signal depends on at least one of the estimated first interference amount and the second interference amount.

3. The method of claim 2, wherein the first interference amount is indicative of the power of an interference to be seen by the first communication device when the first communication device uses the first beamforming vector to receive a data traffic from the second communication device and the second interference amount is indicative of a power of an interference to be seen by the first communication device when the first communication device uses the second beamforming vector to receive a data traffic from the second communication device.

4. The method of claim 2, wherein the at least one request response signal is determined to be sent if the first interference amount is below a certain threshold and if the second interference amount is below the certain threshold.

5. The method of claim 2, wherein the at least one request response signal comprises a first request response signal that corresponds to the first transmission request signal, and the first request response signal is determined to be sent if the first interference amount is below a certain threshold.

6. The method of claim 5, wherein the first request response signal is transmitted with the first beamforming vector.

7. The method of claim 5, further comprising:
recovering an interfering transmission request signal in the transmission request time interval, the interfering transmission request signal is of a higher priority than the first transmission request signal from the second communication device, and wherein the first interference amount is estimated as a function of the power of the recovered interfering transmission request signal.

8. The method of claim 7, wherein the interfering transmission request signal is sent by a third communication device to a fourth communication device, the interfering transmission request signal indicates that the third communication device intends to send a data traffic signal to the fourth communication device and will interfere with the data traffic signal to be sent from the second communication device to the first communication device.

9. The method of claim 8, wherein the at least one request response signal further comprises a second request response signal that corresponds to the second transmission request signal, and the second request response signal is determined to be sent if the second interference amount is below a certain threshold, and the second request response signal is transmitted with the second beamforming vector.

10. The method of claim 9, wherein the interfering transmission request signal is of a higher priority than the second transmission request signal from the second communication device and wherein the second interference amount is estimated as a function of a power of the recovered interfering transmission request signal.

11. The method of claim 9, further comprising:
receiving a data traffic signal from the second communication device subsequent to transmitting at least one request response signal;
applying the first beamforming vector to the received data traffic signal to recover a first set of data information; and
applying the second beamforming vector to the received data traffic signal to recover a second set of data information.

12. The method of claim 5, further comprising:
receiving a data traffic signal from the second communication device subsequent to transmitting the at least one request response signal; and
applying the first beamforming vector to the received data traffic signal to recover a first set of data information.

13. The method of claim 1, further comprising:
calculating a first and a second beamforming vectors for receiving data traffic from the second communication device prior to receiving the signals at the two antennas in the transmission request time interval.

14. A wireless communications apparatus, comprising:
a memory that retains instructions related to receiving a first signal and a second signal at two or more antennas connected to wireless communications apparatus, applying a first beamforming vector to the first signal received to recover a first transmission request signal, applying a second beamforming vector to the second signal to recover a second transmission request signal, evaluating whether to send a request response signal in a subsequent request response time interval, and transmitting the request response signal if the evaluation indicates to send the request response signal, wherein the first signal and the second signal are received in two distinct channel resources, one channel resource corresponds to at least one tone in an OFDM symbol; and
a processor, coupled to the memory, configured to execute the instructions retained in the memory.

15. The wireless communications apparatus of claim 14, the memory retains further instructions related to estimating a first interference amount associated with the first transmission request signal and a second interference amount associated with the second transmission request signal, wherein the determination of whether to send the at least one request response signal depends on the estimated first interference amount, the estimated second interference amount, or both the estimated first interference amount and the estimated second interference amount.

16. The wireless communications apparatus of claim 15, wherein the first interference amount is indicative of the power of an interference to be seen by the wireless communications device when the wireless communications devices utilizes a first beamforming vector to receive a data traffic from the second communication device and the second interference amount is indicative of a power of an interference to be seen by the wireless communications device when the wireless communications device utilizes a second beamforming vector to receive a data traffic from the second communication device.

17. A wireless communications apparatus that receives data traffic in a peer-to-peer communications network, the wireless communications apparatus is equipped with at least two antennas, the wireless communications apparatus comprising:
    means for receiving a first signal and a second signal at the at least two antennas in a transmission request time interval, wherein the first signal and the second signal are received in two distinct channel resources, one channel resource corresponds to at least one tone in an OFDM symbol;
    means for applying a first beamforming vector to the first signal received at the at least two antennas to recover a first transmission request signal from the second communication device;
    means for applying a second beamforming vector to the second signal received at the at least two antennas to recover a second transmission request signal from the second communication device;
    means for determining whether to send at least one request response signal to the second communication device in a subsequent request response time interval; and
    means for transmitting the at least one request response signal to a second communication device if it is determined to send the request response signals.

18. The wireless communications apparatus of claim 17, further comprising:
    means for estimating a first interference amount associated with the first transmission request signal and a second interference amount associated with the second transmission request signal, wherein the determination of whether to send the at least one request response signal depends on at least one of the estimated first interference amount and the second interference amount.

19. A computer program product, comprising:
a computer-readable medium comprising:
    a first set of codes for causing a computer to receive a first signal and a second signal at two antennas in a transmission request time interval, wherein the first signal and the second signal are received in two distinct channel resources, one channel resource corresponds to at least one tone in an OFDM symbol;
    a second set of codes for causing the computer to apply a first beamforming vector to the first signal received at the two antennas to recover a first transmission request signal;
    a third set of codes for causing the computer to apply a second beamforming vector to the second signal received at the at least two antennas to recover a second transmission request signal;
    a fourth set of codes for causing the computer to determine whether to send at least one request response signal; and
    a fifth set of codes for causing the computer to transmit the at least one request response signal.

20. The computer program product of claim 19, the computer-readable medium further comprising:
    a sixth set of codes for causing the computer to calculate a first and a second beamforming vectors for receiving data traffic prior to receiving the signals at the two antennas in the transmission request time interval.

21. At least one processor configured to receive data traffic in a peer-to-peer communication network, comprising:
    a first module for receiving a first signal and a second signal at two or more antennas, wherein the first signal and the second signal are received in two distinct channel resources, one channel resource corresponds to at least one tone in an OFDM symbol;
    a second module for applying a first beamforming vector to the first signal received to recover a first transmission request signal;
    a third module for applying a second beamforming vector to the second signal to recover a second transmission request signal;
    a fourth module for evaluating whether to send a request response signal in a subsequent request response time interval; and
    a fifth module for transmitting the request response signal if the evaluation indicates to send the request response signal.

22. A method of operating a first communication device for transmitting data traffic to a second communication device in a multiple-input-multiple-output peer-to-peer communication environment, the first device is equipped with at least two antennas, the method comprising:
    transmitting a first transmission request signal with a first beamforming vector and a second transmission request signal with a second beamforming vector, the first and second transmission request signals are transmitted by the at least two antennas, wherein the first transmission request signal and the second transmission request signal are transmitted in two distinct channel resources, one channel resource corresponds to at least one tone in an OFDM symbol;
    receiving signals at the at least two antennas in a subsequent request response time interval;
    recovering from the received signals at least one request response signal from the second communication device, the at least one request response signal corresponds to the first transmission request signal and the second transmission request signal;
    determining whether to send a data traffic signal to the second communication device as a function of the recovered request response signal; and
    transmitting the data traffic signal to the second communication device if it is determined to send the data traffic signal.

23. The method of claim 22, wherein the received signals include a first signal and a second signal received in two distinct channel resources that respectively correspond to the distinct channel resources in which the first and second transmission request signals are transmitted, and the at least one request response signal includes a first and a second request response signals that correspond to the first and second transmission request signals respectively, the first request response signal is recovered by applying the first beamforming vector to the first received signal and the second request response signal is recovered by applying the second beamforming vector to the second received signal.

24. The method of claim 23, further comprising:
estimating a first interference cost amount associated with the first transmission request signal and a second interference cost amount associated with the second transmission request signal, and wherein the determination of whether to send the data traffic signals depends on at least one of the estimated first and second interference cost amounts.

25. The method of claim 24, wherein it is determined to transmit a first data traffic signal if the recovered first request response signal is positive and the estimated first interference cost amount is below a certain threshold.

26. The method of claim 25, wherein the recovered first request response signal is positive if the power of the recovered first request response signal exceeds a threshold.

27. The method of claim 25, further comprising:
generating a first set of coded modulation symbols from a first set of data information;
applying the first beamforming vector to the first set of coded modulation symbols to generate the first data traffic signal; and
transmitting the first data traffic signal in the channel resources of a traffic channel segment at the at least two antennas.

28. The method of claim 27, further comprising:
generating a second set of coded modulation symbols from a second set of data information;
applying the second beamforming vector to the second set of coded modulation symbols to generate the second data traffic signal; and
transmitting the second data traffic signal at the at least two antennas, the second data traffic signal is transmitted in the channel resources of the same traffic channel segment as the first data traffic signal.

29. The method of claim 25, further comprising:
receiving an interfering request response signal at the at least two antennas in the request response time interval, the interfering transmission request signal is of a higher priority than the first request response signal from the second communication device; and
applying the first beamforming vector to the received interfering request response signal to obtain a first resultant signal;
wherein the first interference cost amount is estimated as a function of the power of the first resultant signal.

30. The method of claim 29, wherein the interfering request response signal is sent by a third communication device to a fourth communication device, the interfering request response signal indicates that the third communication device intends to receive a data traffic signal from the fourth communication device and will be interfered by the data traffic signal to be sent from the first communication device to the second communication device.

31. The method of claim 30, wherein the first interference cost amount is indicative of the power of an interference to be seen by the third communication device when the first communication device transmits a data traffic to the second device using the first beamforming vector.

32. The method of claim 29, wherein the first interference cost amount is further estimated as a function of the transmission power of the first transmission request signal.

33. The method of claim 29, wherein it is determined to transmit a second data traffic signal if the recovered second request response signal is positive and the estimated second interference cost amount is below a certain threshold.

34. The method of claim 33, further comprising:
receiving an interfering request response signal at the at least two antennas in the request response time interval, the interfering transmission request signal is of a higher priority than the second request response signal from the second communication device; and
applying the second beamforming vector to the received interfering request response signal to obtain a second resultant signal;
wherein the second interference cost amount is estimated as a function of the power of the second resultant signal.

35. The method of claim 34, wherein the second interference cost amount is further estimated as a function of the transmission power of the second transmission request signal.

36. The method of claim 29, wherein it is determined to transmit only the first data traffic signal if the recovered second request response signal is negative or the estimated second interference cost amount is above a certain threshold, the method further comprising:
generating a first set of coded modulation symbols from a first set of data information;
applying the first beamforming vector to the first set of coded modulation symbols to generate the first data traffic signal; and
transmitting the first data traffic signal in the channel resources of a traffic channel segment at the at least two antennas.

37. The method of claim 22, further comprising:
calculating the first and second beamforming vectors for transmitting data traffic to the second communication device prior to transmitting the first and second transmission request signals.

38. A wireless communications apparatus, comprising:
a memory that retains instructions related to sending a first transmission request signal with a first beamforming vector and a second transmission request signal with a second beamforming vector, the first and second transmission request signals are sent by at least two antennas, receiving signals at the at least two antennas in a subsequent request response time interval, recovering from the received signals at least one request response signal, the at least one request response signal corresponds to the first transmission request signal and the second transmission request signal, determining whether to send a data traffic signal as a function of the recovered request response signal, and transmitting the data traffic signal if it is determined to send the data traffic signal, wherein the first transmission request signal and the second transmission request signal are transmitted in two distinct channel resources, one channel resource corresponds to at least one tone in an OFDM symbol; and
a processor, coupled to the memory, configured to execute the instructions retained in the memory.

39. The wireless communications apparatus of claim 38, wherein the received signals include a first signal and a second signal received in two distinct channel resources that respectively correspond to the distinct channel resources in which the first and second transmission request signals are transmitted, and the at least one request response signal includes a first request response signal and a second request response signal that correspond to the first and second transmission request signals respectively, the first request response signal is recovered by applying the first beamforming vector to the first received signal and the second request response signal is recovered by applying the second beamforming vector to the second received signal.

40. The wireless communications apparatus of claim 39, the memory retains further instructions related to estimating a first interference cost amount associated with the first transmission request signal and a second interference cost amount associated with the second transmission request signal, and wherein the determination of whether to send the data traffic signals depends on at least one of the estimated first and second interference cost amounts.

41. The wireless communications apparatus of claim 39, wherein it is determined to transmit a first data traffic signal if the recovered first request response signal is positive and the estimated first interference cost amount is below a certain threshold.

42. A wireless communications apparatus that transmits data traffic in a multiple-input-multiple-output peer-to-peer communication environment, comprising:
    means for transmitting a first transmission request signal with a first beamforming vector and a second transmission request signal with a second beamforming vector, the first and second transmission request signals are transmitted by at least two antennas, wherein the first transmission request signal and the second transmission request signal are transmitted in two distinct channel resources, one channel resource corresponds to at least one tone in an OFDM symbol;
    means for receiving signals at the at least two antennas in a subsequent request response time interval;
    means for recovering from the received signals at least one request response signal from a communication device, the at least one request response signal corresponds to the first transmission request signal and the second transmission request signal;
    means for determining whether to send a data traffic signal to the communication device as a function of the recovered request response signal; and
    means for transmitting the data traffic signal to the communication device if it is determined to send the data traffic signal.

43. The wireless communications apparatus of claim 42, wherein the received signals include a first signal and a second signal received in two distinct channel resources that respectively correspond to the distinct channel resources in which the first and second transmission request signals are transmitted, and the at least one request response signal includes a first and a second request response signals that correspond to the first and second transmission request signals respectively, the first request response signal is recovered by applying the first beamforming vector to the first received signal and the second request response signal is recovered by applying the second beamforming vector to the second received signal.

44. A computer program product, comprising:
    a computer-readable medium comprising:
        a first set of codes for causing a computer to transmit a first transmission request signal with a first beamforming vector and a second transmission request signal with a second beamforming vector, the first and second transmission request signals are transmitted by at least two antennas, wherein the first transmission request signal and the second transmission request signal are transmitted in two distinct channel resources, one channel resource corresponds to at least one tone in an OFDM symbol;
        a second set of codes for causing the computer to receive signals at the at least two antennas in a subsequent request response time interval;
        a third set of codes for causing the computer to recover from the received signals at least one request response signal, the at least one request response signal corresponds to the first transmission request signal and the second transmission request signal;
        a fourth set of codes for causing the computer to determine whether to send a data traffic signal as a function of the recovered request response signal; and
        a fifth set of codes for causing the computer to transmit the data traffic signal if it is determined to send the data traffic signal.

45. At least one processor configured to transmit data traffic to a second communication device in a multiple-input-multiple-output peer-to-peer communication environment, comprising:
    a first module for transmitting a first transmission request signal with a first beamforming vector and a second transmission request signal with a second beamforming vector, the first and second transmission request signals are transmitted by at least two antennas, wherein the first transmission request signal and the second transmission request signal are transmitted in two distinct channel resources, one channel resource corresponds to at least one tone in an OFDM symbol;
    a second module for receiving signals at the at least two antennas in a subsequent request response time interval;
    a third module for recovering from the received signals at least one request response signal, the at least one request response signal corresponds to the first transmission request signal and the second transmission request signal;
    a fourth module for determining whether to send a data traffic signal as a function of the recovered request response signal; and
    a fifth module for transmitting the data traffic signal.

* * * * *